(12) United States Patent
Kim et al.

(10) Patent No.: US 11,771,935 B2
(45) Date of Patent: *Oct. 3, 2023

(54) ENERGY STORAGE MODULE

(71) Applicant: SAMSUNG SDI CO., LTD., Yongin-si (KR)

(72) Inventors: Jin Taek Kim, Yongin-si (KR); Eun Ok Kwak, Yongin-si (KR); Jang Hoon Kim, Yongin-si (KR); Jin Bhum Yun, Yongin-si (KR); Jong Yeol Woo, Yongin-si (KR); Kwang Deuk Lee, Yongin-si (KR); Woo Sung Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/014,976

(22) Filed: Sep. 8, 2020

(65) Prior Publication Data

US 2021/0069537 A1 Mar. 11, 2021

(30) Foreign Application Priority Data

Sep. 5, 2019 (KR) .................. 10-2019-0110366
Sep. 4, 2020 (KR) .................. 10-2020-0113377

(51) Int. Cl.
*H01M 10/658* (2014.01)
*H01M 50/383* (2021.01)
(Continued)

(52) U.S. Cl.
CPC ............ *A62C 3/16* (2013.01); *A62C 99/0045* (2013.01); *H01M 50/20* (2021.01);
(Continued)

(58) Field of Classification Search
CPC .. H01M 50/383; H01M 10/658; H01M 50/24; H01M 50/40
See application file for complete search history.

(56) References Cited

U.S. PATENT DOCUMENTS

| 5,047,272 A | 9/1991 | Hassel et al. |
| 5,817,434 A | 10/1998 | Brooker et al. |
| (Continued) | | |

FOREIGN PATENT DOCUMENTS

| CN | 102468463 A | 5/2012 |
| CN | 106654462 A | 5/2017 |
| (Continued) | | |

OTHER PUBLICATIONS

U.S. Notice of Allowance dated Jul. 23, 2021, issued in U.S. Appl. No. 16/901,547 (8 pages).

(Continued)

*Primary Examiner* — James Lee
(74) *Attorney, Agent, or Firm* — Lewis Roca Rothgerber Christie LLP

(57) ABSTRACT

An energy storage module includes: a plurality of battery cells arranged in a length direction; a plurality of insulation spacers; a cover member including an internal receiving space; a top plate coupled to a top of the cover member, the top plate including ducts respectively corresponding to vents of the battery cells and having opening holes respectively corresponding to the insulation spacers; a top cover coupled to a top of the top plate and having discharge holes respectively corresponding to the ducts; and an extinguisher sheet between the top cover and the top plate, the extinguisher sheet being configured to emit a fire extinguishing agent at a temperature exceeding a reference temperature, the top cover including protrusion parts on a bottom surface thereof, (Continued)

the protrusion parts covering an exhaust region and being coupled to an exterior of each of the ducts.

16 Claims, 19 Drawing Sheets

(51) Int. Cl.
| | |
|---|---|
| *H01M 50/40* | (2021.01) |
| *A62C 3/16* | (2006.01) |
| *A62C 99/00* | (2010.01) |
| *H01M 50/20* | (2021.01) |
| *H01M 50/44* | (2021.01) |
| *H01M 50/30* | (2021.01) |
| *H01M 50/431* | (2021.01) |

(52) U.S. Cl.
CPC ....... *H01M 50/394* (2021.01); *H01M 50/431* (2021.01); *H01M 50/44* (2021.01); *H01M 2200/10* (2013.01); *H01M 2220/10* (2013.01)

(56) References Cited

U.S. PATENT DOCUMENTS

| | | | |
|---|---|---|---|
| 6,136,423 A | 10/2000 | Fitzpatrick | |
| 6,365,299 B1 | 4/2002 | Miyaki et al. | |
| 7,385,480 B2 | 6/2008 | Fitzpatrick | |
| 8,597,808 B2 | 12/2013 | Park et al. | |
| 8,652,666 B2 | 2/2014 | Kim | |
| 9,406,917 B2 | 8/2016 | Petzinger | |
| 9,627,663 B2 | 4/2017 | Kim | |
| 10,164,229 B2 | 12/2018 | Ohshiba et al. | |
| 10,355,326 B2 | 7/2019 | Petzinger | |
| 10,930,910 B2 | 2/2021 | Fujiwara et al. | |
| 11,145,933 B2 * | 10/2021 | Kim | H01M 10/613 |
| 11,185,726 B2 | 11/2021 | Lee | |
| 2002/0179552 A1 | 12/2002 | Marraffa | |
| 2007/0164711 A1 | 7/2007 | Kim et al. | |
| 2010/0167115 A1 | 7/2010 | Okada et al. | |
| 2010/0248026 A1 | 9/2010 | Hinoki et al. | |
| 2011/0005781 A1 | 1/2011 | Yasui et al. | |
| 2011/0165454 A1 | 7/2011 | Iwamoto et al. | |
| 2011/0274951 A1 | 11/2011 | Yasui et al. | |
| 2011/0313084 A1 | 12/2011 | Furar et al. | |
| 2012/0114993 A1 | 5/2012 | Park et al. | |
| 2012/0270083 A1 | 10/2012 | Kim | |
| 2013/0011701 A1 | 1/2013 | Petzinger | |
| 2013/0052452 A1 | 2/2013 | Lee et al. | |
| 2013/0264077 A1 | 10/2013 | Jung | |
| 2013/0313466 A1 | 11/2013 | Bliznets et al. | |
| 2014/0170447 A1 | 6/2014 | Woehrle et al. | |
| 2014/0322566 A1 | 10/2014 | Kim | |
| 2015/0064514 A1 | 3/2015 | Wu et al. | |
| 2015/0099191 A1 | 4/2015 | Liu et al. | |
| 2015/0221914 A1 | 8/2015 | Page et al. | |
| 2015/0280193 A1 | 10/2015 | Ohshiba et al. | |
| 2015/0303421 A1 | 10/2015 | Tazawa et al. | |
| 2016/0049626 A1 | 2/2016 | Yasui et al. | |
| 2016/0104880 A1 | 4/2016 | Gao et al. | |
| 2016/0218333 A1 | 7/2016 | Takasaki et al. | |
| 2016/0254515 A1 | 9/2016 | Shimoda et al. | |
| 2016/0268564 A1 | 9/2016 | Cho et al. | |
| 2016/0315361 A1 | 10/2016 | Petzinger | |
| 2017/0165513 A1 | 6/2017 | Li | |
| 2017/0334310 A1 | 11/2017 | Yokoyama et al. | |
| 2018/0026245 A1 | 1/2018 | Page et al. | |
| 2018/0190956 A1 | 7/2018 | Lica et al. | |
| 2018/0248160 A1 | 8/2018 | Lee | |
| 2018/0269440 A1 | 9/2018 | Lee et al. | |
| 2018/0294516 A1 | 10/2018 | Huang et al. | |
| 2018/0309107 A1 | 10/2018 | Widener | |
| 2019/0109331 A1 | 4/2019 | Skala | |
| 2019/0168037 A1 | 6/2019 | Lian et al. | |
| 2019/0168615 A1 | 6/2019 | Besson et al. | |
| 2019/0173074 A1 | 6/2019 | Ogawa et al. | |
| 2019/0181419 A1 | 6/2019 | Suba et al. | |
| 2019/0305391 A1 | 10/2019 | Petzinger | |
| 2019/0334143 A1 | 10/2019 | Sugeno | |
| 2020/0014027 A1 | 1/2020 | Ha et al. | |
| 2020/0014078 A1 | 1/2020 | Ha et al. | |
| 2020/0168884 A1 | 5/2020 | Wang et al. | |
| 2020/0243823 A1 | 7/2020 | Morita | |
| 2020/0287180 A1 | 9/2020 | Chen et al. | |
| 2020/0303701 A1 | 9/2020 | Kim et al. | |
| 2020/0350557 A1 | 11/2020 | Ha et al. | |
| 2020/0350566 A1 | 11/2020 | Ha et al. | |
| 2020/0350567 A1 | 11/2020 | Ha et al. | |
| 2020/0350568 A1 | 11/2020 | Lee et al. | |
| 2020/0350574 A1 | 11/2020 | Ha et al. | |
| 2020/0350580 A1 | 11/2020 | Ha et al. | |
| 2020/0350632 A1 | 11/2020 | Ha et al. | |
| 2020/0377690 A1 | 12/2020 | Ootsuki et al. | |
| 2021/0013460 A1 | 1/2021 | Ootsuki et al. | |
| 2021/0296625 A1 | 9/2021 | Li et al. | |
| 2021/0320337 A1 | 10/2021 | Chen et al. | |
| 2021/0328281 A1 | 10/2021 | Chu et al. | |
| 2021/0328304 A1 | 10/2021 | You et al. | |
| 2022/0059902 A1 | 2/2022 | Jiang et al. | |
| 2022/0069411 A1 | 3/2022 | Wakabayashi et al. | |
| 2022/0140434 A1 | 5/2022 | Yoshida et al. | |
| 2022/0149477 A1 | 5/2022 | Yoshida et al. | |
| 2022/0149478 A1 | 5/2022 | Egashira et al. | |

FOREIGN PATENT DOCUMENTS

| | | |
|---|---|---|
| CN | 106785225 A | 5/2017 |
| CN | 206564279 U | 10/2017 |
| CN | 206584999 U | 10/2017 |
| CN | 206834290 U | 1/2018 |
| CN | 107887550 A | 4/2018 |
| CN | 207199806 U | 4/2018 |
| CN | 207977389 U | 10/2018 |
| CN | 109585726 A | 4/2019 |
| EP | 3 386 003 A1 | 10/2018 |
| EP | 3 591 737 A1 | 1/2020 |
| EP | 3 866 233 A1 | 8/2021 |
| JP | 2016-110881 A | 6/2016 |
| JP | 6245038 B2 | 12/2017 |
| JP | 6390062 B2 | 9/2018 |
| JP | 2019-213332 A | 12/2019 |
| KR | 10-1067627 B1 | 9/2011 |
| KR | 2012-0049020 A | 5/2012 |
| KR | 2012-0119407 A | 10/2012 |
| KR | 2014-0127743 A | 11/2014 |
| KR | 10-2016-0021325 A | 2/2016 |
| KR | 10-2016-0146349 A | 12/2016 |
| KR | 10-2019-0023917 A | 3/2019 |
| WO | WO 2013/006796 A1 | 1/2013 |
| WO | WO 2019/117485 A1 | 6/2019 |
| WO | WO 2020/203646 A1 | 10/2020 |

OTHER PUBLICATIONS

Extended European Search Report from related European Application No. 20194594.6, Extended European Search Report dated Feb. 10, 2021 (9 pgs.).
European Patent Office Extended Search Report, for Patent Application No. 20194587.0, dated Feb. 16, 2021, 10 pages.
European Patent Office Extended Search Report, for Patent Application No. 20194592.0, dated Feb. 8, 2021, 9 pages.
European Patent Office Extended Search Report, for Patent Application No. 20194611.8, dated Feb. 16, 2021, 9 pages.
European Patent Office Extended Search Report, for Patent Application No. 20194589.6, dated Mar. 5, 2021, 9 pages.
European Patent Office Extended Search Report, for Patent Application No. 20194573.0, dated Feb. 12, 2021, 9 pages.
European Patent Office Extended Search Report, for Patent Application No. 20194607.6, dated Feb. 8, 2021, 10 pages.
"The Engineering Tool Box", https://www.engineeringtoolbox.com/density-materials-d1652.html, Aug. 30, 2021 (Year: 2021), 16 pages.
U.S. Notice of Allowance from U.S. Appl. No. 16/901,538, dated Mar. 18, 2022, 8 pages.

(56) References Cited

OTHER PUBLICATIONS

U.S. Office Action from U.S. Appl. No. 16/844,914, dated Aug. 19, 2021, 18 pages.
U.S. Office Action from U.S. Appl. No. 16/844,914, dated Mar. 17, 2022, 24 pages.
U.S. Office Action from U.S. Appl. No. 16/844,914, dated Nov. 9, 2021, 18 pages.
U.S. Office Action from U.S. Appl. No. 16/901,474, dated Oct. 20, 2021, 21 pages.
U.S. Office Action from U.S. Appl. No. 16/901,522, dated Dec. 13, 2021, 40 pages.
U.S. Office Action from U.S. Appl. No. 16/901,538, dated Nov. 23, 2021, 20 pages.
U.S. Office Action from U.S. Appl. No. 16/901,541, dated Dec. 8, 2021, 32 pages.
U.S. Office Action from U.S. Appl. No. 16/901,541, dated Mar. 22, 2022, 17 pages.
U.S. Office Action from U.S. Appl. No. 17/014,034, dated Dec. 13, 2021, 40 pages.
U.S. Office Action from U.S. Appl. No. 17/014,061, dated Feb. 15, 2022, 20 pages.
U.S. Office Action from U.S. Appl. No. 17/014,853, dated Dec. 13, 2021, 39 pages.
U.S. Office Action from U.S. Appl. No. 17/014,900, dated Dec. 10, 2021, 21 pages.
U.S. Office Action from U.S. Appl. No. 17/014,900, dated Mar. 28, 2022, 8 pages.
U.S. Office Action from U.S. Appl. No. 17/014,970, dated Mar. 2, 2022, 38 pages.
U.S. Restriction Requirement from U.S. Appl. No. 16/844,914, dated May 12, 2021, 6 pages.
U.S. Restriction Requirement from U.S. Appl. No. 17/014,970, dated Oct. 22, 2021, 6 pages.
Machine English Translation of CN207199806U, 3 pages.
PubChem Compound Summary for Vermiculite, retrieved on Apr. 5, 2022 from the Internet: https://pubchem.ncbi.nlm.nih.gov/compound/156593754 (Year: 2022).
U.S. Advisory Action from U.S. Appl. No. 16/844,914, dated Jan. 20, 2022, 4 pages.
U.S. Notice of Allowance from U.S. Appl. No. 16/901,547, dated Jul. 23, 2021, 8 pages.
U.S. Office Action from U.S. Appl. No. 16/901,474, dated Apr. 25, 2022, 37 pages.
U.S. Office Action from U.S. Appl. No. 16/901,527, dated Apr. 11, 2022, 24 pages.
Advisory Action for U.S. Appl. No. 16/901,474 dated Jul. 7, 2022, 4 pages.
Final Office Action for U.S. Appl. No. 17/014,970 dated Jun. 24, 2022, 38 pages.
Collins Online Dictionary entry for "space", accessed at https://www.collinsdictionary.com/us/dictionary/english/space on May 18, 2022 (Year: 2022).
Google define feature utilizing Oxford Languages Dictionary for "space", accessed at google.com on May 18, 2022 (Year: 2022).
U.S. Office Action from U.S. Appl. No. 16/901,522, dated May 27, 2022, 24 pages.
U.S. Notice of Allowance from U.S. Appl. No. 16/901,541, dated Jun. 1, 2022, 8 pages.
U.S. Office Action from U.S. Appl. No. 17/014,034, dated May 25, 2022, 38 pages.
U.S. Office Action from U.S. Appl. No. 17/014,853, dated May 31, 2022, 24 pages.
Advisory Action for U.S. Appl. No. 17/014,970 dated Sep. 9, 2022, 3 pages.
Chinese Office Action for CN Application No. 202010920922.X dated Jul. 6, 2022, 13 pages.
Chinese Office Action for CN Application No. 202010921351.1 dated Jul. 5, 2022, 9 pages.
Final Office Action for U.S. Appl. No. 16/844,914 dated Jul. 20, 2022, 8 pages.
Final Office Action for U.S. Appl. No. 16/901,527 dated Oct. 4, 2022, 22 pages.
Final Office Action for U.S. Appl. No. 17/014,061 dated Jul. 18, 2022, 16 pages.
Notice of Allowance for U.S. Appl. No. 16/844,914 dated Sep. 28, 2022, 7 pages.
Notice of Allowance for U.S. Appl. No. 16/901,538 dated Sep. 16, 2022, 9 pages.
Notice of Allowance for U.S. Appl. No. 16/901,541 dated Jul. 27, 2022, 8 pages.
Notice of Allowance for U.S. Appl. No. 17/014,900 dated Aug. 30, 2022, 8 pages.
Office Action for U.S. Appl. No. 16/901,474 dated Aug. 17, 2022, 22 pages.
Office Action for U.S. Appl. No. 16/901,522 dated Oct. 4, 2022, 15 pages.
Office Action for U.S. Appl. No. 17/014,034 dated Oct. 4, 2022, 15 pages.
Office Action for U.S. Appl. No. 17/014,853 dated Oct. 4, 2022, 25 pages.
Office Action for U.S. Appl. No. 17/014,970 dated Oct. 5, 2022, 38 pages.
Advisory Action for U.S. Appl. No. 17/014,061 dated Oct. 21, 2022, 7 pages.
Chinese Office Action for CN Application No. 202010921939.7 dated Aug. 1, 2022, 9 pages.
Notice of Allowance for U.S. Appl. No. 16/844,914 dated Dec. 8, 2022, 8 pages.
Notice of Allowance for U.S. Appl. No. 16/901,474 dated Dec. 13, 2022, 10 pages.
Notice of Allowance for U.S. Appl. No. 16/901,538 dated Nov. 23, 2022, 9 pages.
Notice of Allowance for U.S. Appl. No. 16/901,541 dated Dec. 14, 2022, 8 pages.
Notice of Allowance for U.S. Appl. No. 17/014,034 dated Jan. 27, 2023, 7 pages.
Notice of Allowance for U.S. Appl. No. 17/014,900 dated Feb. 13, 2023, 8 pages.
Office Action for U.S. Appl. No. 17/014,089 dated Dec. 9, 2022, 8 pages.
U.S. Office Action dated Feb. 24, 2023, issued in U.S. Appl. No. 16/901,527 (26 pages).
U.S. Notice of Allowance dated Mar. 7, 2023, issued in U.S. Appl. No. 17/014,089 (11 pages).
U.S. Final Office Action dated Mar. 13, 2023, issued in U.S. Appl. No. 16/901,522 (13 pages).
U.S. Final Office Action dated Mar. 13, 2023, issued in U.S. Appl. No. 17/014,853 (21 pages).
U.S. Office Action dated Mar. 15, 2023, issued in U.S. Appl. No. 17/014,061 (16 pages).
U.S. Final Office Action dated Apr. 13, 2023, issued in U.S. Appl. No. 17/014,970 (43 pages).
U.S. Office Action dated Jun. 30, 2023, issued in U.S. Appl. No. 17/014,853 (31 pages).

* cited by examiner

ENERGY STORAGE MODULE

CROSS-REFERENCE TO RELATED APPLICATIONS

This application claims priority to and the benefit of each of Korean Patent Application No. 10-2019-0110366, filed on Sep. 5, 2019 in the Korean Intellectual Property Office, and Korean Patent Application No. 10-2020-0113377, filed on Sep. 4, 2020 in the Korean Intellectual Property Office, the entire content of each of which is herein incorporated by reference.

BACKGROUND

1. Field

Aspects of embodiments of the present disclosure relate to an energy storage module.

2. Description of the Related Art

An energy storage module may be linked to a renewable energy and power system, such as, for example, a solar cell, to store electric power when demand for electric power from a load is low and to use (or discharge or provide) the stored electric power when demand for electric power is high. The energy storage module generally includes (or is) an apparatus including a relatively large quantity of battery cells (e.g., secondary batteries or secondary battery cells).

The battery cells are generally received (or accommodated) in multiple trays, which are received (or accommodated) in a rack, and multiple racks are received (or accommodated) in a container box.

However, there have recently been instances in which a fire occurs in energy storage modules. And, once a fire starts in an energy storage module, it is not easy to extinguish due to the characteristics of the energy storage module. Because the energy storage module, which includes multiple battery cells, generally exhibits high-capacity and high-output characteristics, research into technology to increase the safety of the energy storage module is being actively conducted.

SUMMARY

According to an aspect of embodiments of the present disclosure, an energy storage module which exhibits increased safety by reducing or minimizing the risk of a fire spreading to adjacent battery cells when a fire occurs is provided.

The above and other aspects and features of the present disclosure will be described in or will be apparent from the following description of some example embodiments of the present disclosure.

According to one or more embodiments of the present disclosure, an energy storage module includes: a plurality of battery cells arranged in a length direction such that long side surfaces of adjacent ones of the battery cells face one another; a plurality of insulation spacers, at least one of the insulation spacers being between the long side surfaces of each adjacent pair of the battery cells; a cover member comprising an internal receiving space configured to accommodate the battery cells and the insulation spacers; a top plate coupled to a top of the cover member, the top plate comprising ducts respectively corresponding to vents of the battery cells and having opening holes respectively corresponding to the insulation spacers; a top cover coupled to a top of the top plate and having discharge holes respectively corresponding to the ducts; and an extinguisher sheet between the top cover and the top plate, the extinguisher sheet being configured to emit a fire extinguishing agent at a temperature exceeding a reference temperature, and the top cover comprises protrusion parts on a bottom surface thereof, the protrusion parts covering an exhaust region and being coupled to an exterior of each of the ducts, and each of the insulation spacers comprises a heat-insulating first sheet and flame-retardant or non-combustible second sheets respectively adhered to opposite surfaces of the first sheet by an adhesion member.

The first sheet may include ceramic paper, and the second sheets may include mica paper.

The first sheet may include a ceramic fiber comprising an alkaline earth metal.

The long side surfaces of the adjacent battery cells may be spaced apart from each other by a first distance, and a thickness of each of the insulation spacers may be less than 50% of the first distance.

When the fire extinguishing agent is emitted from the extinguisher sheet, the fire extinguishing agent may be applied to spaces between the insulation spacers and the battery cells through the opening holes to be brought into contact with the long side surfaces of the battery cells.

Each of the insulation spacers may have a width-direction size less than twice a height-direction size thereof and may include a sheet part including the first sheet and the second sheets adhered to each other at opposite ends thereof by the adhesion member.

Each of the insulation spacers may further include an edge part made of a plastic material, the edge part being formed by insert molding to cover peripheral edges of the sheet part.

The first sheet and the second sheets may be spaced apart from each other at central portions thereof to define air passages to allow for air movement.

A width-direction size of each of the insulation spacers may be greater than twice a height-direction size thereof, and the first sheet and the second sheets respectively may include regions adhered to each other by the adhesion member.

The top cover may further include an inclined part to have a gradually increasing thickness from the exhaust region to the protrusion part.

A top end of each of the ducts may be located below the inclined part.

A space may be defined between each of the ducts and a corresponding one of the protrusion parts, and some of the gas discharged through each of the vents may move to the respective space via the duct and the inclined part.

Each of the ducts may taper away from a bottom portion thereof with an inner diameter thereof gradually decreasing upwards.

An overall area occupied by the discharge holes may be not less than about 30% of an area of the exhaust region.

At least some of the above and other features of the invention are set out in the claims.

As described, an energy storage module according to embodiments of the present disclosure can prevent or reduce heat from spreading to adjacent battery cells by rapidly extinguishing and cooling a battery cell when a vent of the battery cell opens (or ruptures) and/or when a fire occurs.

DETAILED DESCRIPTION

Figure 1:
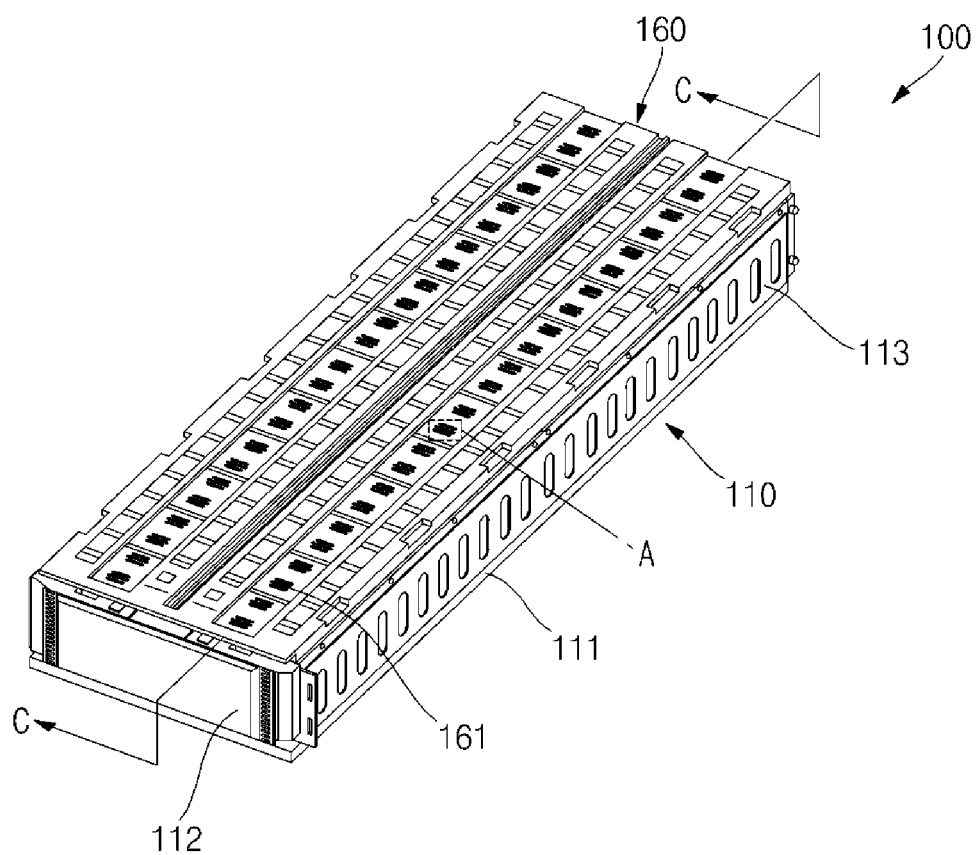
FIG. 1 is a perspective view of an energy storage module according to an embodiment of the present disclosure.

Herein, some example embodiments of the present disclosure will be described in further detail. The subject matter of the present disclosure, however, may be embodied in many different forms and should not be construed as being limited to the example embodiments set forth herein. Rather, these example embodiments are provided so that this disclosure will be thorough and complete and will convey the aspects and features of the present disclosure to those skilled in the art.

In addition, in the accompanying drawings, sizes or thicknesses of various components may be exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A may be directly connected to the element B or one or more intervening elements C may be present therebetween such that the element A and the element B are indirectly connected to each other.

The terminology used herein is for the purpose of describing particular embodiments and is not intended to be limiting of the disclosure. As used herein, the singular forms are intended to include the plural forms as well, unless the context clearly indicates otherwise. It is to be further understood that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the term "below" can encompass both an orientation of above and below.

Unless otherwise defined, all terms (including technical and scientific terms) used herein have the same meaning as commonly understood by one of ordinary skill in the art to which this disclosure belongs. It is to be further understood that terms, such as those defined in commonly used dictionaries, should be interpreted as having a meaning that is consistent with their meaning in the context of the relevant art and are not to be interpreted in an idealized or overly formal sense unless expressly so defined herein.

Herein, a configuration of an energy storage module according to embodiments of the present disclosure will be described.

Figure 2:
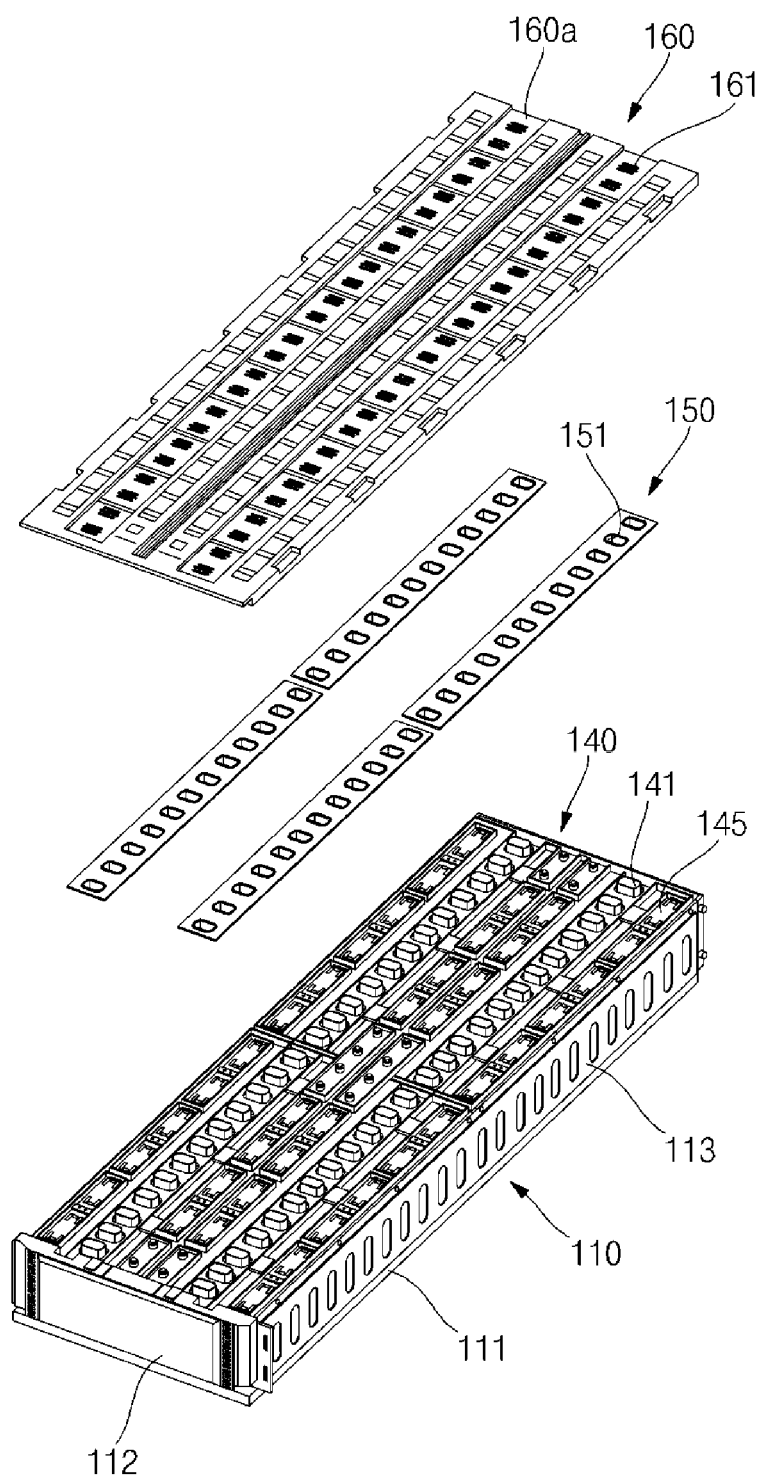
FIG. 2 is an exploded perspective view of the energy storage module according to an embodiment of the present disclosure.
Figure 3:
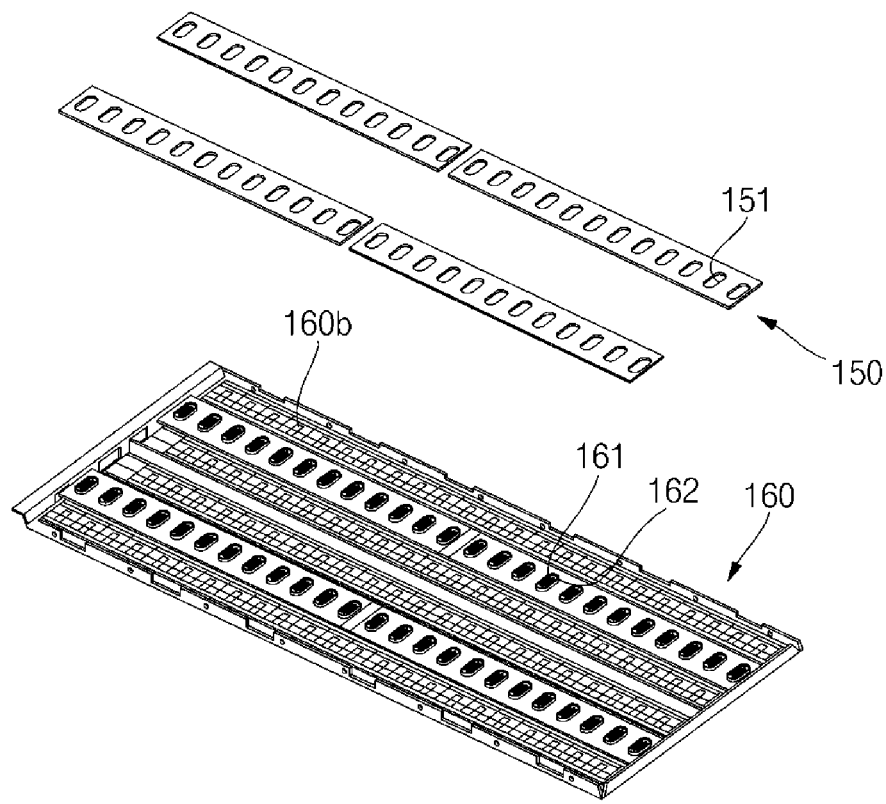
FIG. 3 is an exploded bottom perspective view of an extinguisher sheet and a top cover of the energy storage module according to an embodiment of the present disclosure.
Figure 4:
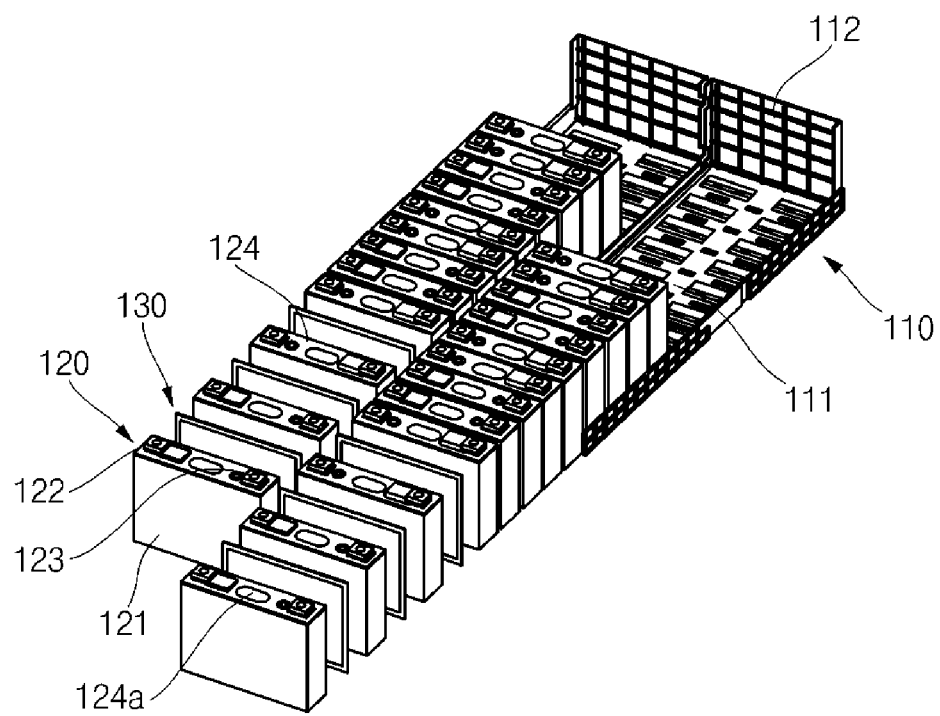
FIG. 4 is a perspective view illustrating battery cells and insulation spacers arranged on a bottom plate of the energy storage module according to an embodiment of the present disclosure.

FIG. 1 is a perspective view of an energy storage module according to an embodiment of the present disclosure; FIG. 2 is an exploded perspective view of the energy storage module according to an embodiment of the present disclosure; FIG. 3 is an exploded bottom perspective view of an extinguisher sheet and a top cover of the energy storage module according to an embodiment of the present disclosure; and FIG. 4 is a perspective view illustrating battery cells and insulation spacers arranged on a bottom plate of the energy storage module according to an embodiment of the present disclosure.

Referring to FIGS. 1 to 4, an energy storage module 100 according to an embodiment of the present disclosure includes a cover member 110, battery cells 120, insulation spacers 130, a top plate 140, an extinguisher sheet 150, and a top cover 160.

The cover member 110 provides an internal space for receiving (or accommodating) the battery cells 120 and the insulation spacers 130. In an embodiment, the cover member 110 includes a bottom plate 111, an end plate (or a plurality of end plates) 112, and a side plate (or a plurality of side plates) 113 which together form a space for accommodating the battery cells 120 and the insulation spacers 130. In addition, the cover member 110 may fix positions of the battery cells 120 and the insulation spacers 130 and may protect the battery cells 120 from external impacts.

Each of the battery cells 120 is configured such that an electrode assembly is accommodated in a case 121 and the electrode assembly is wound, stacked, or laminated in a state in which a separator is positioned between a positive electrode plate and a negative electrode plate, each having a portion coated with an active material, e.g., a coating portion. In addition, a top portion of the case 121 may be sealed by a cap plate 124. In an embodiment, a vent 124a is located at approximately a center of the cap plate 124 and has a smaller thickness than other regions of the cap plate 124. In an embodiment, electrode terminals 122 and 123, which are electrically connected to uncoated regions (e.g., uncoated portions) of the positive and negative electrode plates, may be exposed at an upper portion of the case 121 through the cap plate 124. The electrode terminals 122 and 123 may be referred to as a first electrode terminal 122 and a second electrode terminal 123, respectively, defining, for example, a negative electrode terminal and a positive electrode terminal. However, the polarities of the electrode terminals 122 and 123 may be reversed, defining a positive electrode terminal and a negative electrode terminal, respectively. Occurrences of ignition of the battery cells 120 can be reduced by using particular compositions of active materials of the battery cells 120, thereby increasing safety.

The insulation spacers 130 may be positioned between each of (e.g., between adjacent ones of) the battery cells 120 to prevent or substantially prevent the battery cells 120 from contacting one another, thereby maintaining the battery cells 120 (e.g., the cases 121 of the battery cells 120) in an electrically isolated state. In addition, a reference distance or space (e.g., a predetermined distance) is maintained between each of the insulation spacers 130 and the battery cells 120 to establish external air passages (e.g., fire extinguishing agent passages), thereby allowing for the cooling of the battery cells 120. The insulation spacers 130 include a flame-retardant (or non-combustible) sheet that prevents (or substantially impedes) a fire from spreading to neighboring battery cells 120, and a heat-insulating sheet that prevents (or substantially impedes) heat from propagating to neighboring battery cells 120 when a fire starts in any of the battery cells 120. Configurations of the insulation spacers 130 will be described in further detail below.

The top plate 140 is coupled to a top portion (e.g., a top surface or a top) of the cover member 110. The top plate 140 may be coupled to the cover member 110 while covering top portions (e.g., top surfaces) of the battery cells 120. In addition, the first electrode terminals 122 and second electrode terminals 123 of the battery cells 120 are exposed to (or through) the top plate 140, and bus bars 145 are coupled to the respective terminals 122 and 123, thereby connecting the battery cells 120 to one another in series, in parallel, or in series/parallel.

The top plate 140 includes a plurality of ducts 141 located to respectively correspond to the vents 124a, which are located on the top surface of each of the battery cells 120. The ducts 141 may be arranged in a direction, for example, in a length direction of the top plate 140. Accordingly, the gas discharged from the vent 124a of one of the battery cells 120 may move upwardly along a corresponding one of the ducts 141 of the top plate 140. A configuration and operation of the ducts 141 will be described in further detail below.

The extinguisher sheet 150 is positioned between the top plate 140 and the top cover 160. The extinguisher sheet 150 may be provided as one or more members (or sheets) extending in a direction, for example, in the length direction, of the top plate 140. In addition, the extinguisher sheet 150 may include openings (e.g., opening holes) positioned to respectively correspond to the ducts 141 of the top plate 140. Accordingly, the extinguisher sheet 150 may be positioned such that the openings therein are respectively aligned with the ducts 141 of the top plate 140. In addition, the extinguisher sheet 150 may be coupled to a bottom surface 160b of the top cover 160. Because the extinguisher sheet 150 is coupled to the bottom surface 160b of the top cover 160, the extinguisher sheet 150 may be positioned above the top plate 140. A configuration and operation of the extinguisher sheet 150 will be described below in further detail.

The top cover 160 is coupled to the top portion of the top plate 140. The top cover 160 may cover the top plate 140 and the bus bars 145. The top cover 160 also covers the extinguisher sheet 150, which is coupled to the bottom surface 160b of the top cover 160, thereby protecting the top plate 140, the bus bars 145, and the extinguisher sheet 150 from external impacts applied to a top surface 160a of the top cover 160. In addition, the top cover 160 includes discharge openings (e.g., discharge holes) 161. In addition, the top cover 160 further includes protrusion parts (e.g., protrusions) 162 spaced a distance apart from the outer periphery of (e.g., extending around a periphery of) respective ones of the discharge holes 161, and the protrusion parts 162 downwardly protrude from the top cover 160. Openings (e.g., opening holes) 151 of the extinguisher sheet 150 may be coupled to (e.g., may extend around) the exterior of respective ones of the protrusion parts 162, and the ducts 141 may be coupled to (e.g., may extend into) the interior of the protrusion parts 162. In an embodiment, the discharge holes 161 may each include a plurality of discharge openings (e.g., discharge sub-openings) arranged in a direction, for example, in a length direction, of the top cover 160. In addition, the discharge holes 161 may be positioned to respectively correspond to the ducts 141 of the top plate 140. In addition, like the ducts 141, the discharge holes 161 may each be provided as a plurality of openings passing through top and bottom surfaces of the top plate 140 and spaced apart from one another. Accordingly, the gases discharged from the vent 124a of the battery cell 120 when the vent 124a ruptures may be discharged to the exterior through the corresponding duct 141 of the top plate 140 and the corresponding discharge opening 161 of the top cover 160 and may facilitate user safety by preventing or substantially preventing a user's hand from contacting an internal structure of the top cover 160.

In an embodiment, a rack includes a plurality of shelves and a plurality of the energy storage modules 100 accommodated on the shelves thereof. For example, the rack include the plurality of shelves installed to be upwardly spaced apart from one another, and one or more energy storage modules 100 may be accommodated on each of the shelves. Here, a bottom surface of one of the energy storage modules 100 may contact a top surface of a first shelf, and a bottom surface of another one of the energy storage modules 100 may be positioned on the top surface of a second shelf while being spaced a distance apart from the top surface of the first shelf.

Herein, a coupling relationship between each of the ducts 141 of the top plate 140 and the top cover 160 in the energy storage system 100 according to an embodiment of the present disclosure will be described in further detail.

Figure 5:
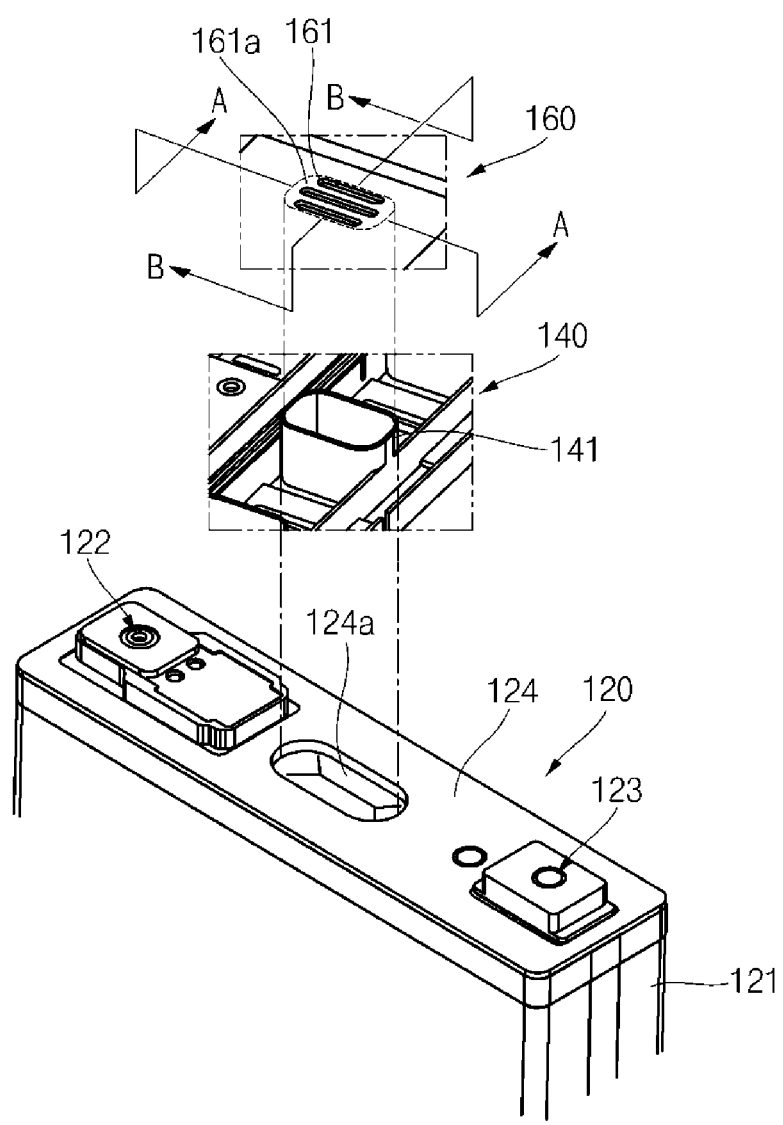
FIG. 5 is a partial exploded perspective view illustrating a battery cell, a top plate, and a top cover of the energy storage module according to an embodiment of the present disclosure.
Figure 6:
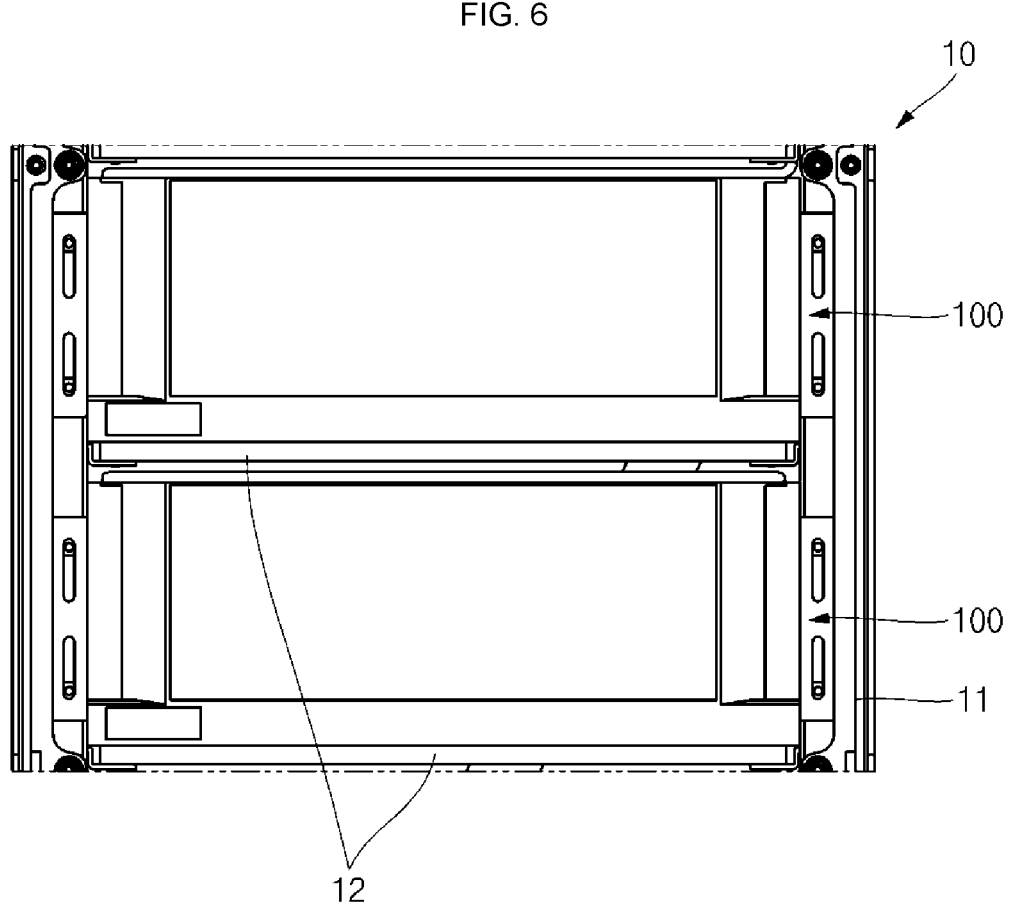
FIG. 6 partially illustrates a rack on which energy storage modules are coupled according to an embodiment of the present disclosure.
Figure 7A:
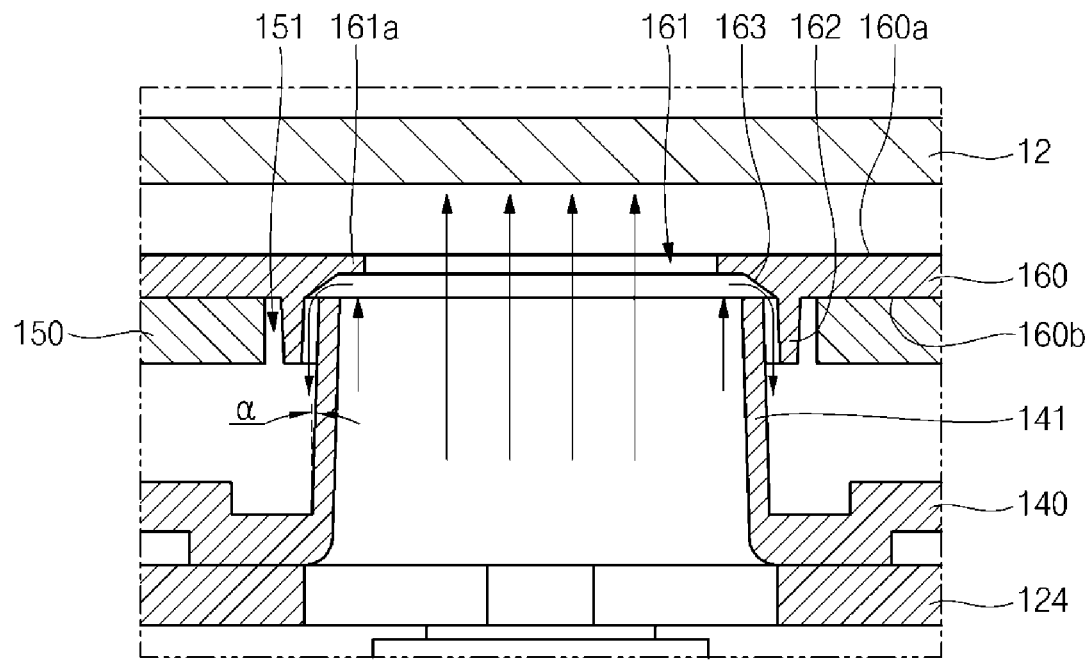
FIGS. 7A and 7B are cross-sectional views taken along the lines A-A and B-B, respectively, of FIG. 5.
Figure 7B:
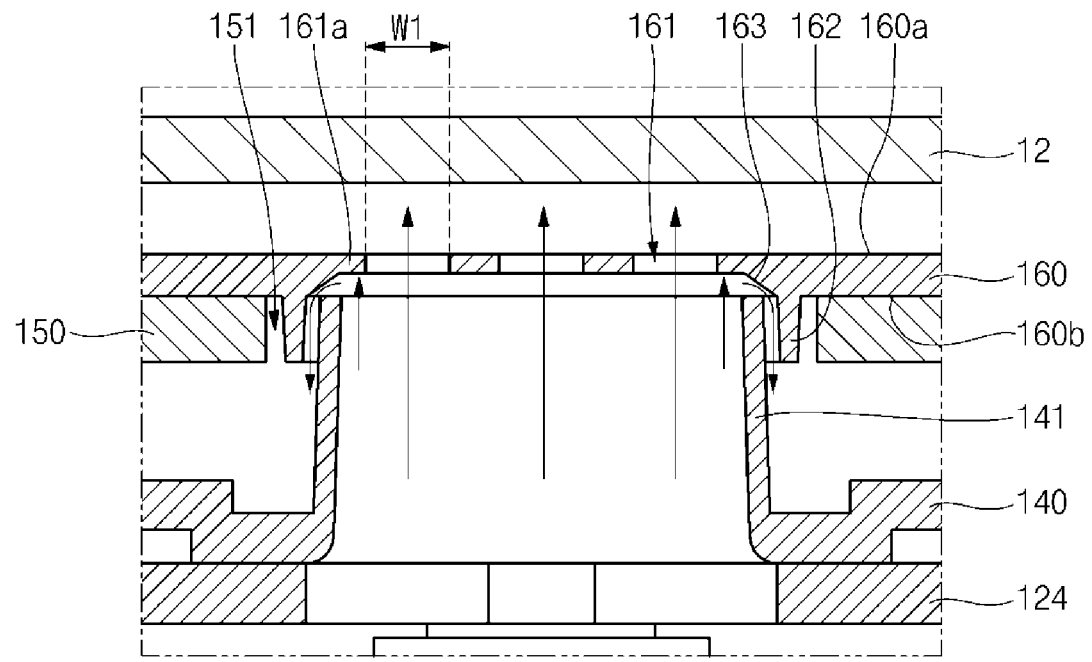
Figure 7C:
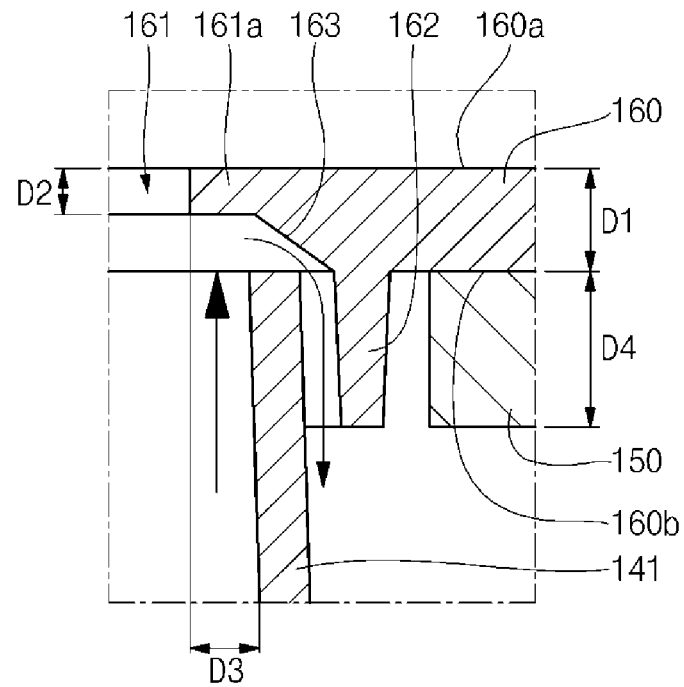
FIG. 7C is a partial enlarged view of FIG. 7A.
Figure 8:
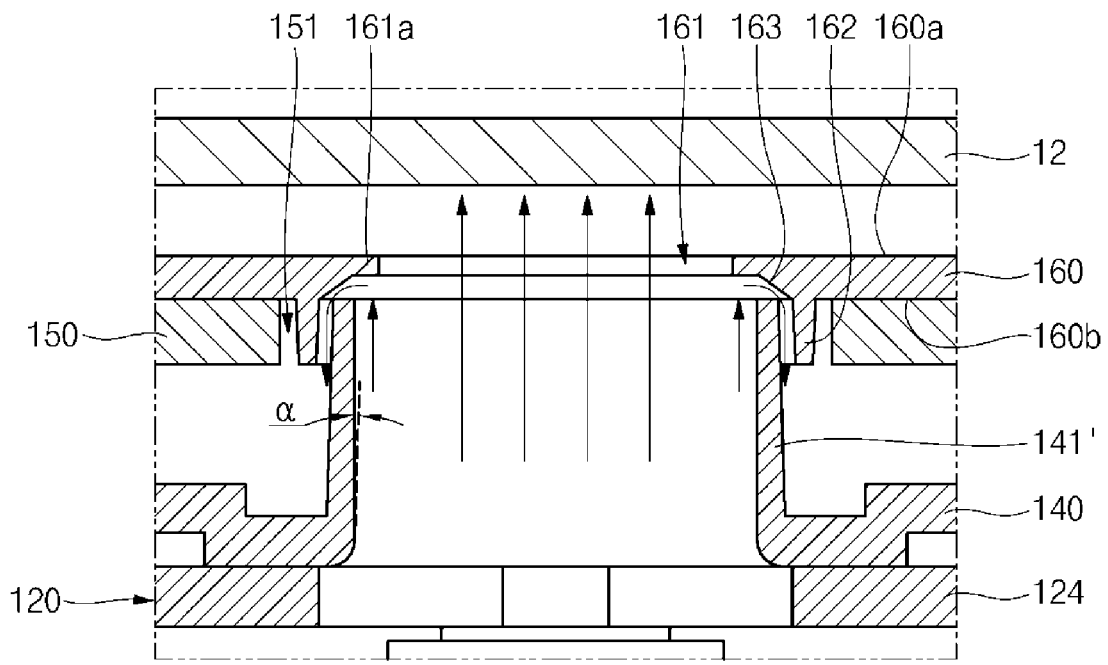
FIG. 8 is a cross-sectional view of a duct according to an embodiment of the present disclosure.

FIG. 5 is a partial exploded perspective view illustrating a battery cell, a top plate, and a top cover of the energy storage module 100 according to an embodiment of the present disclosure. FIG. 6 partially illustrates a rack on which energy storage modules are coupled according to an embodiment of the present disclosure. FIGS. 7A and 7B are cross-sectional views taken along the lines A-A and B-B, respectively, of FIG. 5; and FIG. 7C is a partial enlarged view of FIG. 7A. FIG. 8 is a cross-sectional view of a duct according to an embodiment of the present disclosure.

Referring to FIG. 5, the ducts 141 located on the top plate 140 respectively correspond to the vents 124$a$ of the battery cells 120, and the discharge holes 161 of the top cover 160 are positioned to respectively correspond to the ducts 141 of the top plate 140.

The duct 141 is a passage through which the gas discharged through the vent 124$a$ of the battery cell 120 passes, and protrudes from the top plate 140. In an embodiment, the duct 141 may have a cross-sectional shape, e.g., an elliptical shape, corresponding to the vent 124$a$ of each of the battery cells 120. In an embodiment, the duct 141 may taper away from a bottom portion thereof with an inner diameter thereof gradually decreasing upward. In some embodiments, the duct 141 may have a uniform thickness and may be inclined at an angle (e.g., a predefined angle) (a) toward the interior thereof. In an embodiment, to allow the gas to be efficiently discharged without obstructing a working range of the vent 124$a$ of the battery cell 120, the angle (a) of inclination of the duct 141 may be in a range from about 1° to about 3°.

In an embodiment, to effectively exhaust the gas discharged through the vent 124$a$ of the battery cell 120, the duct 141 may have a height equivalent to that of the top cover 160. In an embodiment, the height of the duct 141 may be set to be in a range from 15 mm to 20 mm, and, in an embodiment, in a range from 18 mm to 18.4 mm. When the height of the duct 141 is greater than or equal to 15 mm, the gas generated from the vent 124$a$ of the battery cell 120 can be prevented or substantially prevented from returning to the vent 124$a$, even if the gas collides with the shelf 12 after moving along the duct 141. In addition, when the height of the duct 141 is less than or equal to 20 mm, the shelf 12 and the duct 141 can be easily manufactured. In an embodiment, because the height of the duct 141 is equivalent to that of the top cover 160, the gas having gone through the duct 141 may move toward the discharge opening 161 of the top cover 160.

In addition, as shown in FIG. 8, a duct 141' according to another example embodiment of the present disclosure may taper away from a bottom portion thereof with an inner diameter thereof gradually decreasing upward. In addition, the duct 141' may be configured to have a thickness gradually decreasing from a bottom portion thereof to a top portion thereof. In an embodiment, an interior surface of the duct 141' may be gradually upwardly inclined with an angle (e.g., a predefined angle) to the exterior, and an exterior surface of the duct 141' may be gradually upwardly inclined with an angle (e.g., a predefined angle) to the interior. In an embodiment, to allow the gas to be efficiently discharged without obstructing a working range of the vent 124$a$ of the battery cell 120, an inclination angle of the interior of the duct 141' may be in a range from about 1° to about 5°, and, in an embodiment, in a range from about 1° to about 3°, to allow the gas to be sufficiently discharged without obstructing the operation of the vent 124$a$ of the battery cell 120. When the inclination angle is greater than or equal to 1°, the gas generated from the vent 124$a$ of the battery cell 120 can be easily accumulated upwardly. When the inclination angle is less than or equal to 5°, rigidity of the duct 141' can be maintained and upward movement of the gas may be prevented or substantially prevented from being restricted by the duct 141'.

Referring to FIGS. 7A to 7C, the top cover 160 may include an exhaust region 161$a$ having a plurality of discharge openings (e.g., discharge holes) 161 located therein, protrusion parts (e.g., protrusions) 162 located on a bottom surface of the top cover 160, and an inclined part 163 located between the exhaust region 161$a$ and each of the protrusion parts 162. The exhaust region 161$a$ is positioned on a top portion of the duct 141 and can be defined by a region forming peripheries around the discharge holes 161. The exhaust region 161$a$ may have a thickness D2 smaller than a thickness D1 of the top cover 160 (D1>D2). In an embodiment, the thickness D2 of the exhaust region 161$a$ may be two thirds (⅔) of the thickness D1 of the top cover 160. In an embodiment, the thickness D2 of the exhaust region 161$a$ may be at least 1.0 mm. In this case, injection molding can be properly performed while minimizing or reducing occurrence of flames when the gas is discharged. In an embodiment, for example, when the thickness D1 of the top cover 160 is about 2.5 mm, the thickness D2 of the exhaust region 161$a$ may be set to about 1.5 mm.

In addition, the gas exhausted from the vent 124$a$ of the battery cell 120 may be discharged through the discharge holes 161 in the exhaust region 161$a$. While three discharge holes 161 are shown in the illustrated embodiment, the number of discharge holes 161 is not limited to three. In an embodiment, the overall area occupied by the plurality of discharge holes 161 may be set to be not less than about 30% of an area of the exhaust region 161$a$ to exhibit good ventilation performance. In an embodiment, a width W1 of each of the discharge holes 161 may be set to be smaller than 3 mm. If the width W1 of the discharge hole 161 is less than or equal to 3 mm, flames generated in the battery cell 120 may be prevented or substantially prevented from spreading to the exterior and safety can be increased by preventing or substantially preventing a user's hand from directly contacting the battery cell 120 from the exterior of the top cover 160.

The discharge holes 161 are positioned inside (e.g., within) the duct 141, and a top end of the duct 141 is covered (e.g. surrounded) by the exhaust region 161$a$. In other words, as shown in FIG. 7C, an area of the exhaust region 161$a$ where the discharge holes 161 are not located, may extend toward the interior of the duct 141. In an embodiment, a distance D3 of the exhaust region 161$a$ extending toward the interior of the duct 141 may be set to about 2 mm or less, and, in an embodiment, in the range between 1 mm and 1.5 mm.

The protrusion part 162 may protrude from the bottom surface 160b of the top cover 160 and may be coupled to the exterior of the duct 141. The protrusion part 162 may be shaped to correspond to a cross-section of the duct 141 and may cover the exhaust region 161a. In addition, the protrusion part 162 may have a larger cross-section than the duct 141, and a space may exist between the duct 141 and the protrusion part 162. Some of the gases discharged through the vent 124a of the battery cell 120 may strike the exhaust region 161a positioned on the duct 141 to then move to the space. In an embodiment, a height D4 of the protrusion part 162 may be in the range of between about 2 mm and about 4 mm, and, in an embodiment, 3 mm. If the height D4 of the protrusion part 162 is smaller than 2 mm, the length of the protrusion part 162 protruding from the bottom surface 160b of the top cover 160 may not be long enough to guide the gases having collided with the exhaust region 161a to the exterior of the duct 141. If the height D4 of the protrusion part 162 is greater than 4 mm, the length of the protrusion part 162 protruding from the bottom surface 160b of the top cover 160 may be excessively large, and the gases may not be efficiently discharged. In an embodiment, a ratio of the height D4 of the protrusion part 162 to the height of the duct 141 may be about 1:4 to 1:9, and, in an embodiment, 1:6. If the ratio of the height D4 of the protrusion part 162 to the height of the duct 141 is greater than 1:4, the protrusion part 162 may be easily manufactured to cover the top portion of the duct 141. If the ratio of the height D4 of the protrusion part 162 to the height of the duct 141 is less than 1:9, the gases having passed the duct 141 may be easily upwardly guided.

The inclined part 163 is positioned between the exhaust region 161a and the protrusion part 162. The inclined part 163 is configured to be naturally inclined by connecting the exhaust region 161a having a relatively small thickness and the protrusion part 162 in the top cover 160. For example, the inclined part 163 may be configured to have a gradually increasing thickness from the exhaust region 161a to the protrusion part 162. In an embodiment, the top end of the duct 141 is positioned below the inclined part 163. The inclined part 163 may serve to prevent or substantially prevent the gases discharged through the vent 124a of the battery cell 120 from being induced back to the vent 124a. That is, the gases discharged through the vent 124a of the battery cell 120 may be discharged to the exterior of the duct 141 along the inclined part 163 and the protrusion part 162, even if colliding with the exhaust region 161a extending toward the interior of the duct 141 in the course of upwardly moving along the duct 141. Therefore, since the gases are prevented or substantially prevented from being induced back to the vent 124a of the battery cell 120, the safety of the energy storage module 100 can be improved. In an embodiment, the inclined part 163 may be configured to have a slope in the range from about 30° to about 60° with respect to the exterior surface of the duct 141, and, in an embodiment, in the range from 40° to 50°. If the angle of the inclined part 163 with respect to the exterior surface of the duct 141 is greater than 30°, the gases discharged through the vent 124a are allowed to be discharged to the exterior, thereby easily preventing or substantially preventing the discharged gases from being induced back to the vent 124a again. If the angle of the inclined part 163 with respect to the exterior surface of the duct 141 is less than 60°, the inclined part 163 can be advantageously integrated with the protrusion part 162.

Referring back to FIG. 6, the energy storage module 100 may include a plurality of the energy storage modules to be combined with a rack 10. The number of energy storage modules 100 may vary according to the desired capacity, and the energy storage modules 100 may be mounted in the rack 10 and then fixed thereto. The rack 10 may include a frame 11 defining the overall external shape of the rack 10 and shelves 12 at different layers of the frame 11 to support bottom portions (e.g., bottom surfaces) of the energy storage modules 100. In FIG. 6, two shelves 12 are shown in the frame 11 with energy storage modules 100 respectively mounted on the shelves 12, but the present disclosure is not limited to the numbers in the illustrated embodiment.

As shown in FIGS. 7A to 7C, if the vent 124a of a battery cell 120 ruptures, the gas discharged from one of the vents 124a may move upwardly along the duct 141, as indicated by the arrows. The vent 124a remaining in the cap plate 124 is shown in FIGS. 7A and 7B. However, if internal gases are generated, the vent 124a may rupture and then be removed. In addition, some of the discharged gases may move along the inclined part 163 and the protrusion part 162 after colliding with the exhaust region 161a extending toward the interior of the duct 141. In addition, the gases having passed the duct 141 may move toward the exterior through the discharge holes 161 of the top cover 160 positioned above the duct 141. Here, the gases may accumulate between the top surface 160a of the top cover 160 and the adjacent shelf 12 accommodating another energy storage module 100 located above the top surface 160a of the top cover 160. In an embodiment, a distance between the top surface 160a of the top cover 160 and the adjacent shelf 12 may be in a range from about 3 mm to about 7 mm. When the distance is greater than or equal to about 3 mm, the heat generated from the energy storage module 100 can be easily discharged to the exterior. When the distance is less than or equal to about 7 mm, a high-temperature inert gas atmosphere can be easily created.

In an embodiment, when a gas begins to be discharged from a battery cell 120 through the vent 124a, a phase change may begin to occur in a fire-extinguishing agent in the extinguisher sheet 150 at a temperature in a range from about 40° C. to about 60° C., and, in an embodiment, at a temperature in a range from 45° C. to 55° C. However, even in this case, the fire-extinguishing agent may remain inside the extinguisher sheet 150 instead of being sprayed (released) therefrom.

In an embodiment, when, afterwards, the amount of gas discharged through the vent 124a gradually increases and a temperature around the vent 124a rises and reaches a temperature in a range from about 120° C. to about 200° C., and, in an embodiment, a temperature in a range from about 130° C. to 190° C., and, in an embodiment, a temperature in a range from 140° C. to 180° C., a gas containing an electrolytic steam may be generated mainly through the vent 124a. Also, the gas in the above temperature range may allow a heat-resistant plastic constituting the top plate 140 and the top cover 160 to remain unmelted. In addition, although most of the fire-extinguishing agent is not sprayed from the extinguisher sheet 150, spraying of some of the fire-extinguishing agent may begin.

In addition, the inclined part 163 of the top cover 160 may prevent or substantially prevent the initially generated combustible gas having a relatively low temperature from being induced back into the vent. However, if the separator melts due to a further increase in the internal temperature of the battery cell 120, high-temperature inert gas may be generated with flames. As described above, the inert gas may fill the space between the top surface 160*a* of the top cover 160 and the adjacent shelf 12 to create an inert gas atmosphere. The inert gas may also fill the internal space of the duct 141. Such inert gas may prevent or substantially prevent oxygen induction and may prevent or substantially prevent flames generated by the battery cell 120 from spreading to neighboring battery cells 120 or to another energy storage module 100. In addition, the extinguisher sheet 150, which is positioned under the top cover 160, may operate (e.g., may emit or spray the fire extinguishing agent) in response to the high-temperature inert gas.

Herein, a configuration and operation of the extinguisher sheet 150 of the energy storage module 100 according to an embodiment of the present disclosure will be described in further detail.

Figure 9:
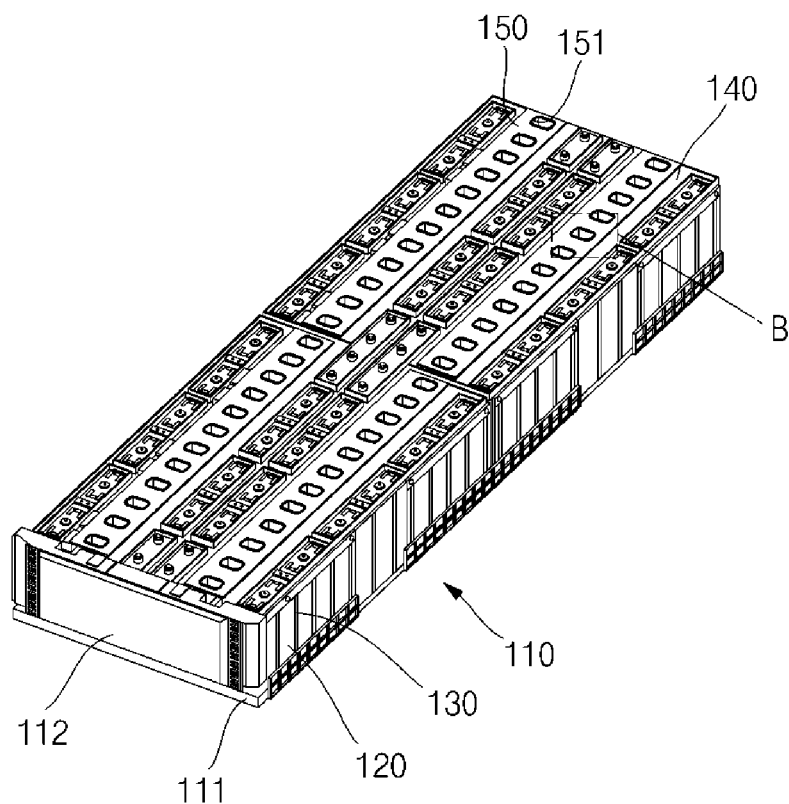
FIG. 9 is a perspective view of the extinguisher sheet coupled to the top plate of the energy storage module according to an embodiment of the present disclosure.
Figure 10:
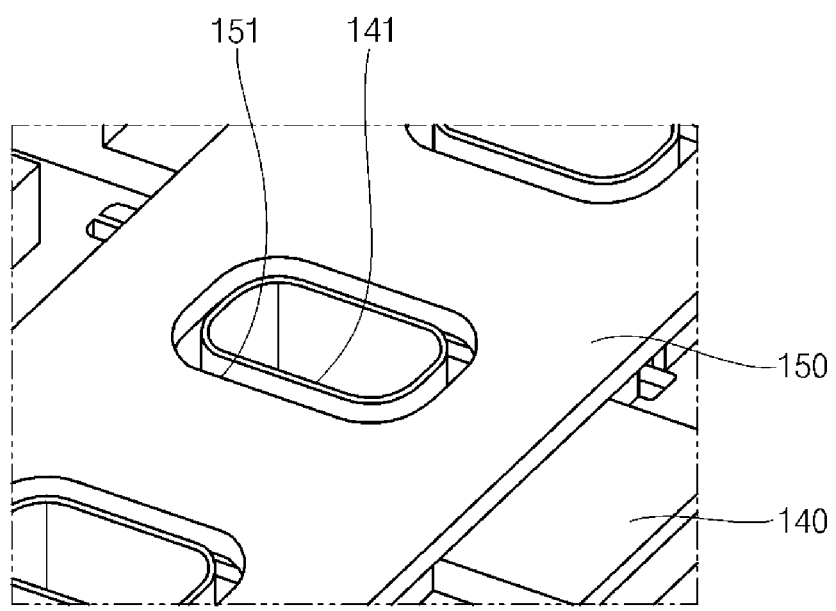
FIG. 10 is an enlarged view of the region "B" of FIG. 9.

FIG. 9 is a perspective view of the extinguisher sheet coupled to the top plate of the energy storage module according to an embodiment of the present disclosure; FIG. 10 is an enlarged view of the region "B" of FIG. 9; and FIGS. 11A and 11B are conceptual diagrams illustrating a state in which an extinguisher sheet operates in the energy storage system according to an embodiment of the present disclosure.

As described above, the extinguisher sheet 150 is positioned between the top plate 140 and the top cover 160. As shown in FIGS. 9 and 10, the extinguisher sheet 150 may have openings (e.g., opening holes) 151 respectively coupled to (e.g., extending around) the ducts 141 of the top plate 140. Accordingly, movement of gas through the ducts 141 may not be influenced (or substantially influenced) by the extinguisher sheet 150.

Figure 11A:
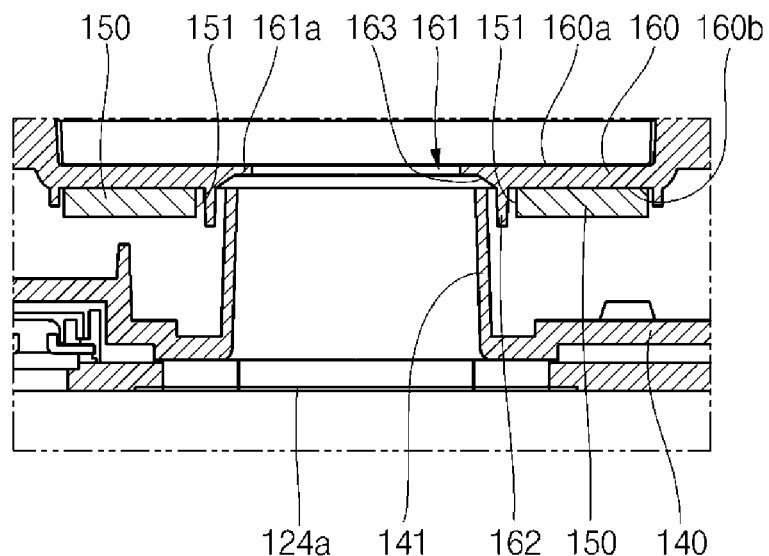
FIGS. 11A and 11B are conceptual diagrams illustrating a state in which an extinguisher sheet operates in the energy storage system according to an embodiment of the present disclosure.
Figure 11B:
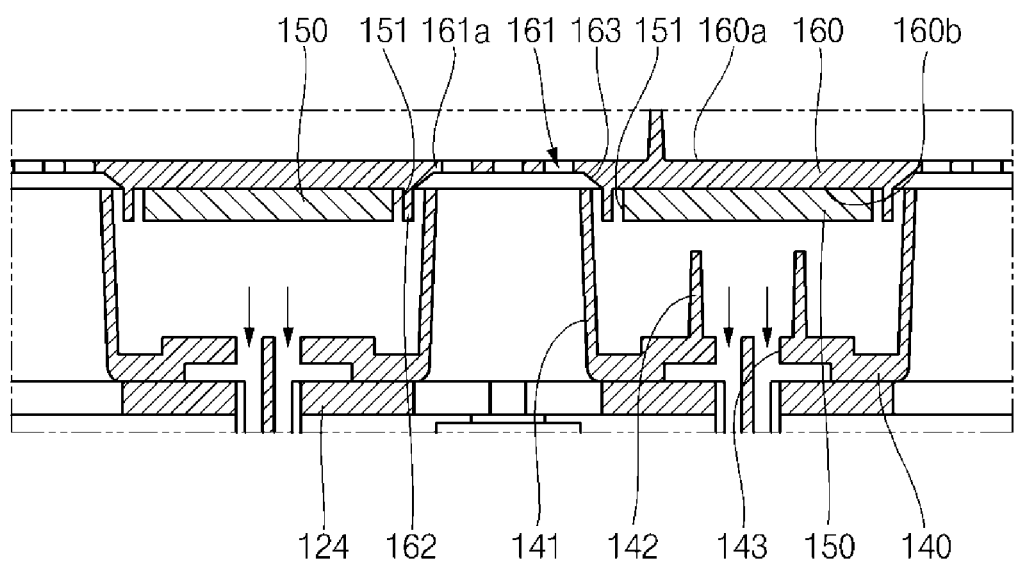

Next, referring to FIGS. 11A and 11B, the extinguisher sheet 150 may operate (e.g., may emit the fire extinguishing agent) in response to heat when the inert gas having a relatively high temperature of, for example, about 200° C., is generated. The fire extinguishing agent contained in the extinguisher sheet 150 is emitted by (e.g., is sprayed from) the extinguisher sheet 150 in response to the high-temperature gas. In addition, because a top portion of the extinguisher sheet 150 is covered by the top cover 160, the fire extinguishing agent may be directionally emitted (or sprayed) toward a direction away from the bottom surface of the top cover 160. In addition, the fire extinguishing agent may reach the underlying insulation spacers 130 through openings (e.g., fire extinguishing agent openings or opening holes) 143 located between adjacent ones of the ducts 141 of the top plate 140. In an embodiment, a fluid guide protrusion 142 may further be provided around the openings 143, thereby efficiently guiding the movement of the fire extinguishing agent toward the insulation spacers 130. As will be further described below, after reaching the insulation spacers 130, the fire extinguishing agent may move along surfaces of the insulation spacers 130, thereby extinguishing a fire on a battery cell 120 and cooling the battery cell 120.

In an embodiment, the extinguisher sheet 150 may include a capsule-type fire extinguishing agent received within (e.g., accommodated or stored in) an external case. As described above, the extinguisher sheet 150 may emit the internal fire extinguishing agent such that the capsule-type fire extinguishing agent and the external case open (or rupture) when the gas passing through the duct 141 of the top plate 140 reaches a relatively high temperature of about 200° C.

Herein, configurations and operations of the battery cells 120 and the insulation spacers 130 in the energy storage module 100 according to an embodiment of the present disclosure will be described.

Figure 12:
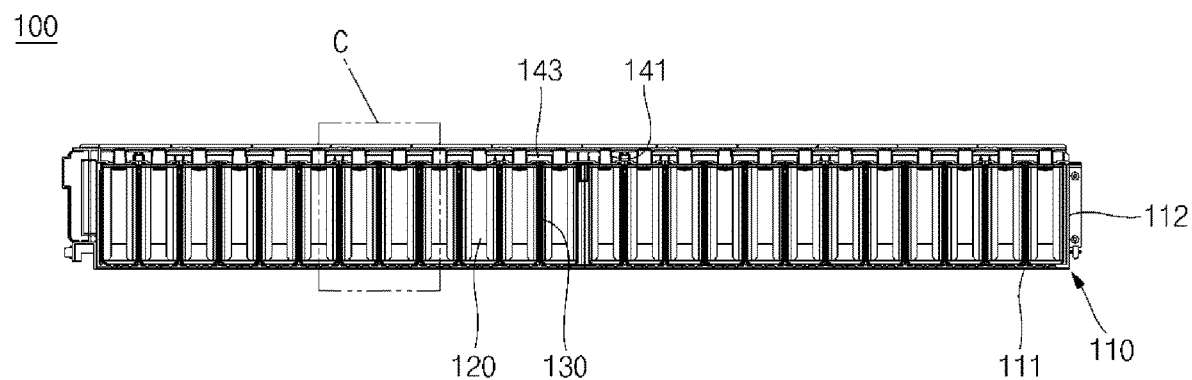
FIG. 12 is a cross-sectional view taken along the line C-C of FIG. 1.
Figure 13:
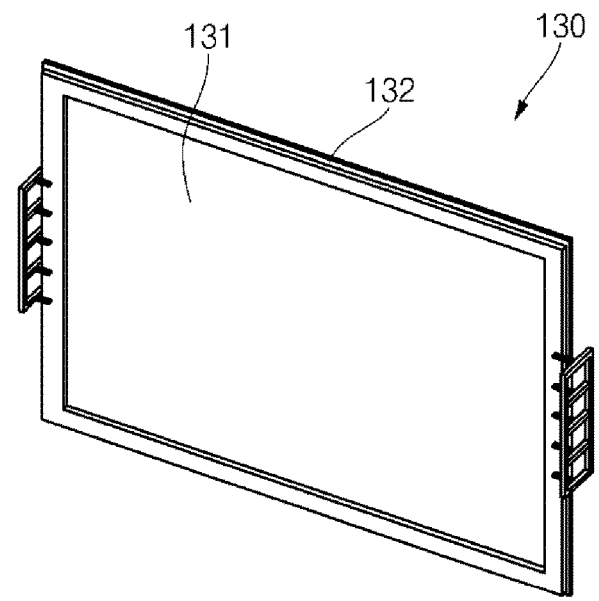
FIG. 13 is a perspective view of an insulation spacer in the energy storage module according to an embodiment of the present disclosure.
Figure 14A:
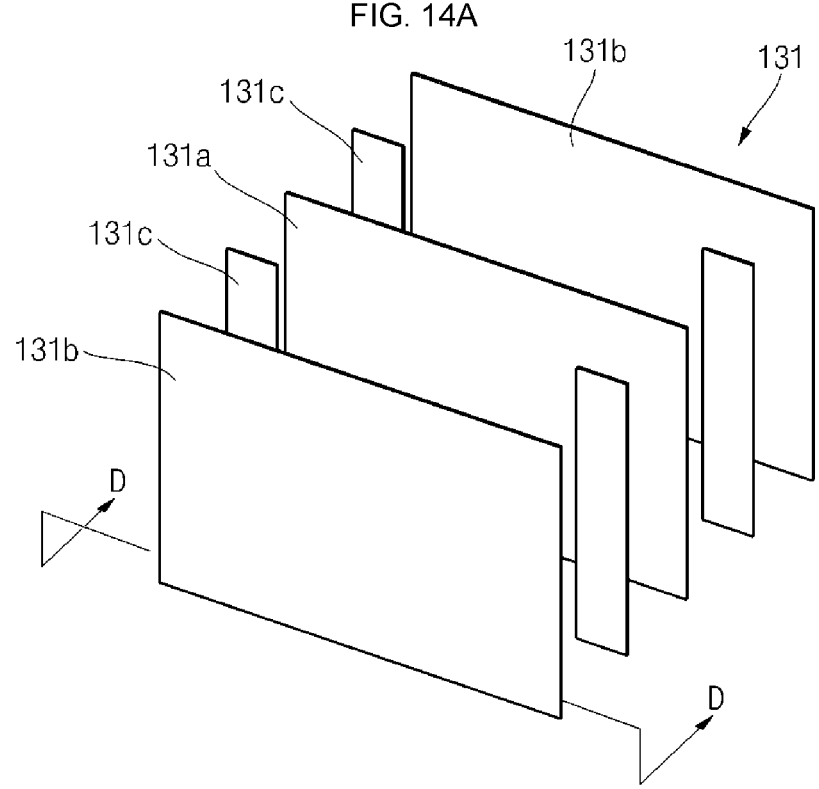
FIGS. 14A and 14B are exploded perspective views illustrating example configurations of sheet parts of the insulation spacer shown in FIG. 13.
Figure 14B:
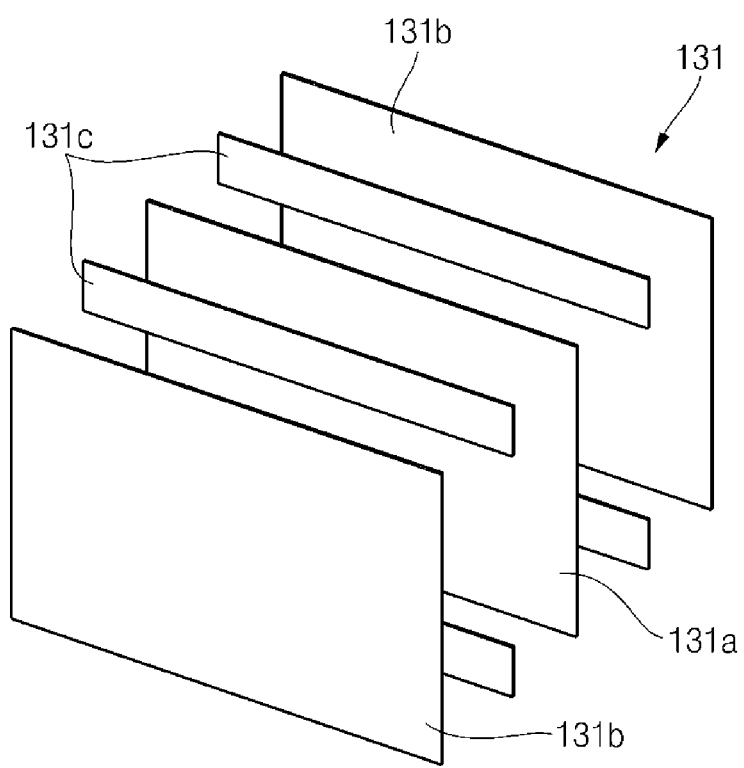
Figure 15:
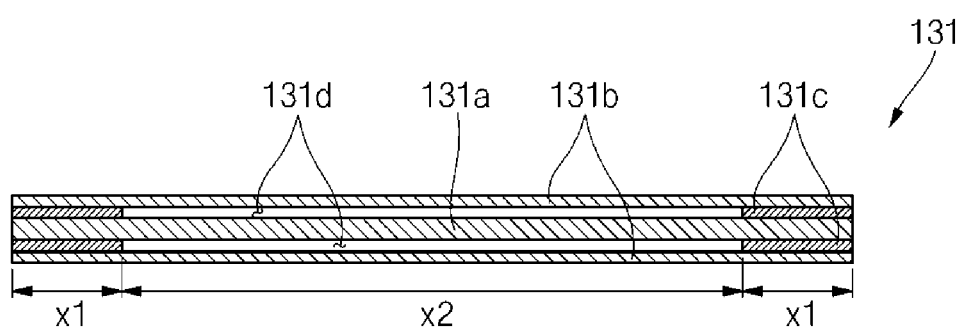
FIG. 15 is a cross-sectional view taken along the line D-D of FIG. 14A after the sheet parts are adhered to each other.
Figure 16:
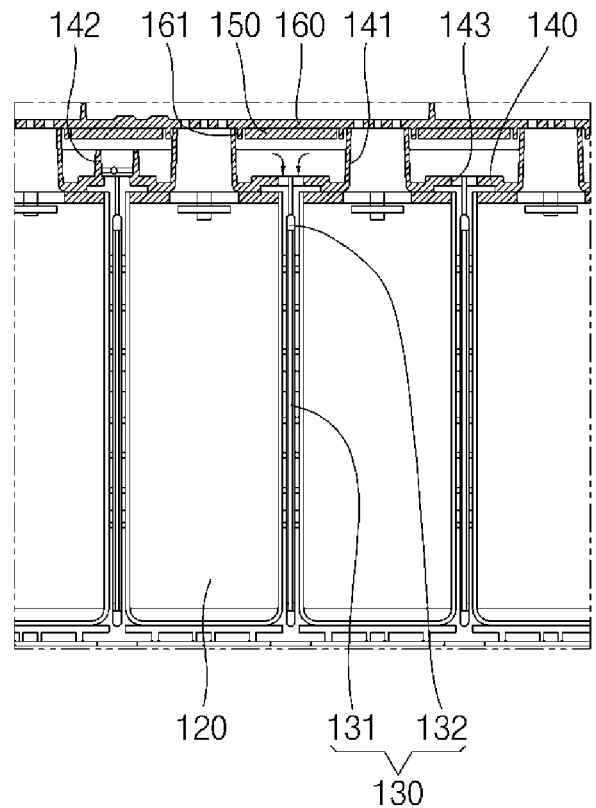
FIG. 16 is an enlarged view of the region "C" of FIG. 12.

FIG. 12 is a cross-sectional view taken along the line C-C of FIG. 1. FIG. 13 is a perspective view of an insulation spacer in the energy storage module according to an embodiment of the present disclosure. FIGS. 14A and 14B are exploded perspective views illustrating example configurations of sheet parts of the insulation spacer shown in FIG. 13; FIG. 15 is a cross-sectional view taken along the line D-D of FIG. 14A after the sheet parts are adhered to each other; and FIG. 16 is an enlarged view of the region "C" of FIG. 12.

The battery cells 120 and insulation spacers 130 may be alternately arranged on a top surface of the bottom plate 111 of the cover member 110. Here, the battery cells 120 may be arranged such that the long side surface of one of the battery cells 120 is spaced a distance (e.g., a reference or predetermined distance) apart from a long side surface of another (e.g., an adjacent) one of the battery cells 120, and the insulation spacers 130 are positioned between the neighboring battery cells 120. In an embodiment, the distance (e.g., a first distance) between the long side surfaces of the two neighboring battery cells 120 may be in a range from about 4 mm to about 6 mm. If the first distance is smaller than 4 mm, it is not easy to provide air layers between the battery cells 120 and the insulation spacers 130, thereby lowering cooling efficiency. If the first distance is greater than 6 mm, the energy storage module 100 may become unnecessarily bulky.

The insulation spacers 130 positioned between each of the battery cells 120 may prevent or substantially prevent the battery cells 120 from contacting each other, thereby maintaining the cases 121 of the battery cells 120 in an electrically isolated state. In an embodiment, each of the insulation spacers 130 may have a planar size corresponding to that of the long side surface of one battery cell 120. For example, one surface of the insulation spacer 130 may face the long side surface of one battery cell 120, and an opposite surface of the insulation spacer 130 may face the long side surface of another battery cell 120.

In addition, the insulation spacer 130 and the long side surface of the battery cell 120 may be spaced apart by a distance (e.g., a second distance) to establish a passage for external air. The battery cell 120 may be cooled by the external air passing through the external air passage.

The insulation spacers 130 may include a sheet part (e.g., a sheet) 131 and an edge part (e.g., an edge) 132. The sheet part 131 may include a flame-retardant (or non-combustible) sheet that prevents (or substantially impedes) a fire from spreading to neighboring battery cells 120, and a heat-insulating sheet that prevents (or substantially impedes) heat from being propagated to neighboring battery cells 120 when a fire starts in any of the battery cells 120. In specific embodiments, the sheet part 131 may include a heat-insulating first sheet 131*a* and a plurality of (e.g., two) flame-retardant (or non-combustible) second sheets 131*b* adhered to opposite surfaces of the first sheet 131*a* by one or more adhesion members 131*c*. The sheet part 131 may have an increased heat insulating effect and may provide flame retardancy (and non-combustibility) by stacking multiple layers of the first sheet 131*a* and the second sheets 131*b*. For example, the insulation spacers 130 may prevent or substantially prevent heat or flames from propagating to neighboring battery cells 120 through the stacked sheet parts 131 when the temperature of the battery cell 120 rises or flames are generated in the battery cell 120.

The insulation spacers 130 may employ a mixture of a flame-retardant or non-combustible sheet that prevents (or substantially mitigates) flames from spreading to neighboring battery cells 120, and a heat-insulating sheet that prevents (or substantially mitigates) heat from being propagated to neighboring battery cells 120 when a fire starts in any of the battery cells 120. Configurations of the insulation spacers 130 will be described in further detail below.

In an embodiment, the first sheet 131a and the second sheets 131b have the same (or substantially the same) size. In an embodiment, a thickness of the insulation spacer 130 may not exceed about 50% of the first distance to facilitate movement of the fire extinguishing agent, which will be described in further detail below. In an embodiment, for example, when the first distance is 6 mm, the thickness of the insulation spacer 130 may not exceed 3 mm, and, when first distance is 4 mm, the thickness of the insulation spacer 130 may not exceed 2 mm. In one embodiment, the first sheet 131a may have a thickness in a range from about 1 mm to about 1.4 mm. In an embodiment, each of the second sheets 131b may have a thickness in a range from about 0.1 mm to about 0.2 mm, and the adhesion member 131c may have a thickness of about 0.1 mm.

For example, the first sheet 131a may include (or may be formed of) ceramic paper, and the second sheets 131b may include (or may be formed of) mica paper. In an embodiment, the first sheet 131a may further include an aerogel. In this embodiment, because an air layer is sufficiently provided in the first sheet 131a, heat insulating efficiency can be increased. In an embodiment, the first sheet 131a may include (or may be) ceramic paper made of a fiber-containing refractory insulating material. In addition, the first sheet 131a may include (or may be) bio-soluble fiber ceramic paper (e.g., a ceramic fiber) containing an alkaline earth metal, which is an eco-friendly high-temperature insulating material that is generally harmless to humans.

In example embodiments, the sheet part 131 may have a configuration shown in FIG. 14A or FIG. 14B.

As shown in FIGS. 14A and 15, the adhesion member 131c may be positioned between the opposite ends of the first sheet 131a and each of the second sheets 131b such that the sheet part 131 has a reference (or predetermined) width. The adhesion member 131c may attach the first sheet 131a and the second sheets 131b to each other. In an embodiment, the adhesion member 131c may have a same length as the first sheet 131a and the second sheets 131b in a length direction. For example, opposite ends x1 of the first sheet 131a may be adhered to respective opposite ends x1 of the second sheets 131b by the adhesion member 131c.

In an embodiment, the adhesion member 131c may have a width in a range from about 10 mm to about 20 mm. Here, if the width of the adhesion member 131c is smaller than about 10 mm, adhesion between the first sheet 131a and the second sheets 131b may be insufficient. If the width of the adhesion member 131c is greater than about 20 mm, an ignition probability may increase due to the adhesion member 131c.

The adhesion member 131c may include any of general adhesion members comprising a variety of adhesive components or configurations, such as, for example, a double-sided tape or an adhesive tape, but the adhesive components and configurations of the adhesion member 131c are not limited thereto.

The adhesion member 131c may attach (e.g., may only attach) the opposite ends x1 of the first sheet 131a to the second sheets 131b such that the first sheet 131a and the second sheets 131b are spaced apart from each other at a central portion x2 of the sheet part 131. As a result, air passages 131d may be established or defined between the first sheet 131a and the second sheets 131b. In addition, if the battery cell(s) 120 swells, the air passages 131d established at the central portion x2 of the sheet part 131 may reduce (or mitigate) compression of the sheet part 131.

As shown in FIG. 14B, according to another embodiment, the adhesion member 131c may be located at an area at (or adjacent to) top and bottom ends of the first sheet 131a to attach the first sheet 131a and the second sheets 131b to each other. In an embodiment, the adhesion member 131c may have a same width as the first sheet 131a and the second sheets 131b in a width direction. For example, the top and bottom ends of the first sheet 131a may be respectively adhered to top and bottom ends of the second sheets 131b by the adhesion member 131c.

In an embodiment, when the sheet part 131 has a width-direction size less than twice a height-direction size thereof, the adhesion member 131c may be attached to the opposite ends of the sheet part 131, as shown in FIG. 14A. In another embodiment, however, when the width-direction size of the sheet part 131 is greater than or equal to twice the height-direction size thereof, an adhesion area (e.g., a vertical adhesion area) may be reduced relative to the overall area of the sheet part 131 due to an area occupied by the adhesion member 131c attached to the opposite ends of the sheet part 131, thereby lowering adhesion performance.

Therefore, in an embodiment, when the width-direction size of the sheet part 131 is greater than twice the height-direction size, the adhesion member 131c may be applied to (e.g., the first sheet 131a and the second sheets 131b may have a region adhered to each other from) the top and bottom ends thereof to increase the adhesion area, thereby improving the adhesion performance. The configuration of the sheet part 131 shown in FIG. 14B may be substantially the same as the sheet part 131 shown in FIGS. 14A and 15, except for positions of the adhesion member(s) 131c.

In an embodiment, when the adhesion member 131c is applied to the top and bottom ends of the sheet part 131, the adhesion performance is improved, and, in some embodiments, no edge part (described below) may be separately required (e.g., an edge part may be omitted).

In some embodiments, an edge part 132 may be provided along peripheral edges of the sheet part 131. The edge part 132 may include (or may be made of) a plastic material, and may be coupled to edges of the sheet part 131 by using a double injection process to fix the shape of the sheet part 131. In an embodiment, for example, the edge part may be made of a general polyethylene or polypropylene. In some embodiments, the edge part 132 may have a width in a range from about 3 mm to about 6 mm. If the width of the edge part 132 is smaller than about 3 mm, the sheet part 131 may not be easily fixed, and, if the width of the edge part 132 is greater than about 6 mm, an ignition probability of the edge part 132 made of a plastic material may be increased.

As described above, when a fire extinguishing agent is applied from top portions of the insulation spacers 130, the fire extinguishing agent may move downwardly along the surfaces of the sheet part 131. Therefore, the fire extinguishing agent may contact the case 121 of the adjacent battery cells 120, thereby performing extinguishing and cooling operations on the battery cells 120. Herein, movement of the fire extinguishing agent will be described in further detail.

As shown in FIG. 16, the top plate 140 further includes openings (e.g., opening holes) 143 respectively located to correspond to (e.g., located over or above) the insulation spacers 130. Accordingly, the fire extinguishing agent, when emitted from the extinguisher sheet 150, may pass through the top plate 140 through the opening holes 143 of the top plate 140 to reach the insulation spacers 130. In addition, the fire extinguishing agent may move along surfaces of the insulation spacers 130 that face the cases 121 of the adjacent battery cells 120, thereby extinguishing any fire and cooling the battery cells 120. The fire extinguishing agent is emitted by the extinguisher sheet 150 located over one or more of the battery cells 120, the temperature of which is higher than a reference temperature. Therefore, the fire extinguishing agent may be sprayed from a top portion of the battery cell 120 having an elevated temperature. In addition, because the fire extinguishing agent moves along the surfaces of the insulation spacers 130 positioned at front and rear sides of the corresponding battery cell 120, both extinguishing and cooling of the corresponding battery cell 120 can be performed.

Herein, a configuration of an energy storage module according to another embodiment of the present disclosure will be described.

Figure 17:
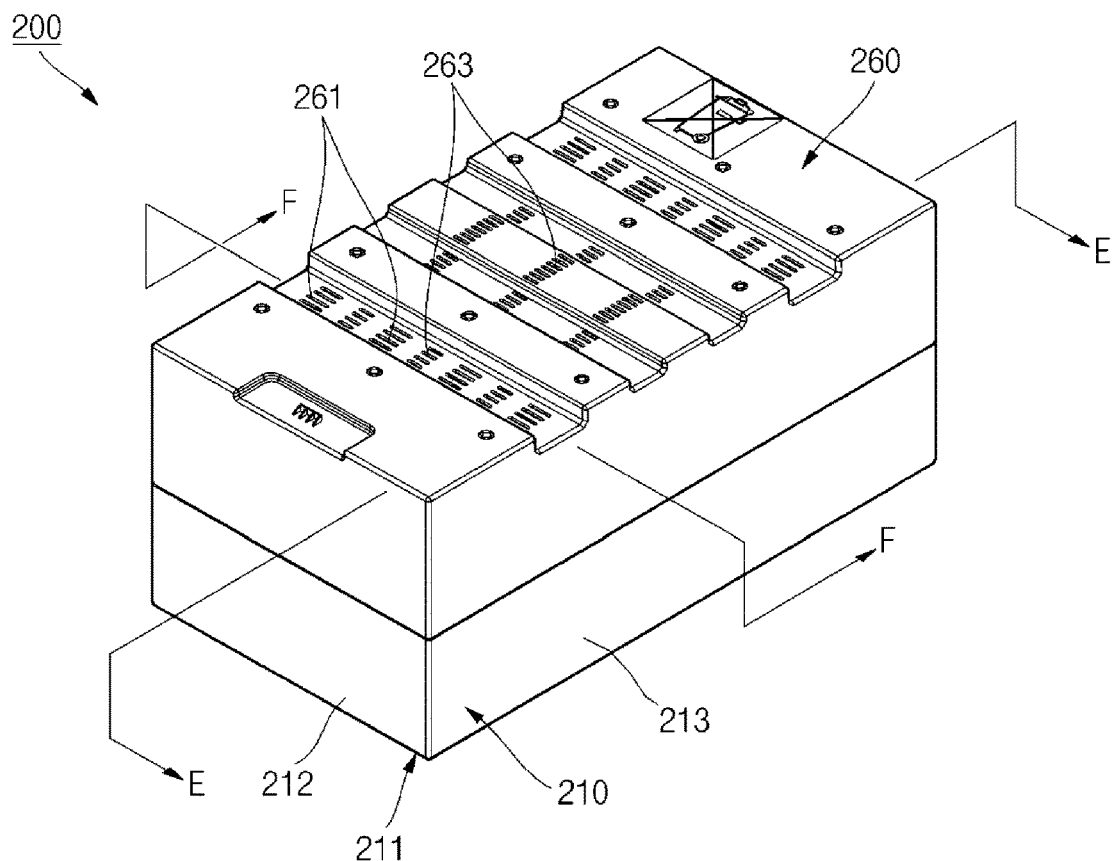
FIG. 17 is a perspective view of an energy storage module according to another embodiment of the present disclosure.
Figure 18:
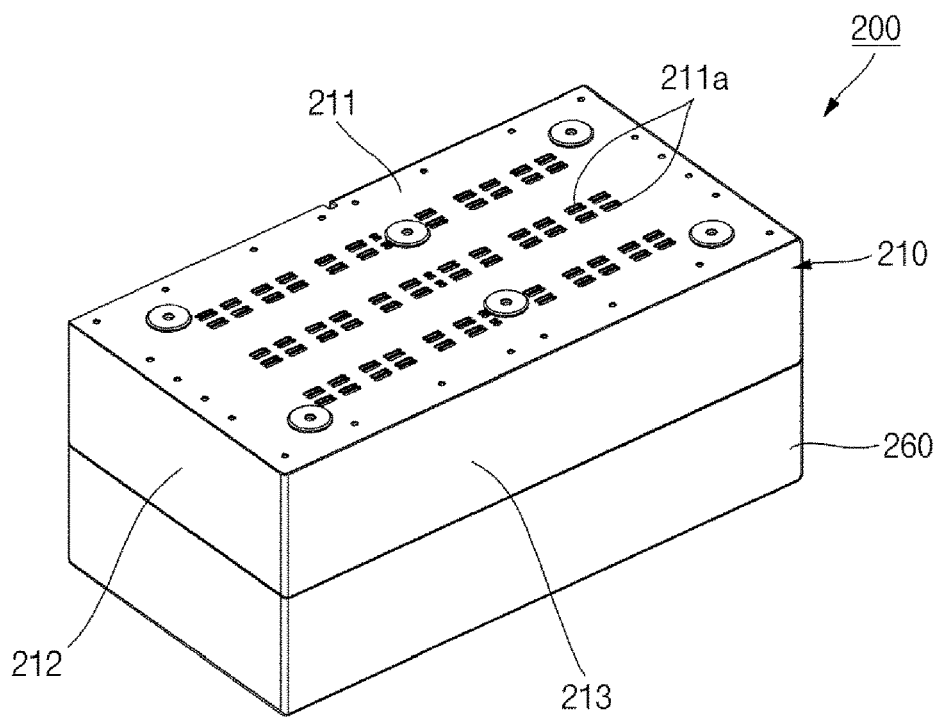
FIG. 18 is a bottom perspective view of the energy storage module of FIG. 17.
Figure 19:
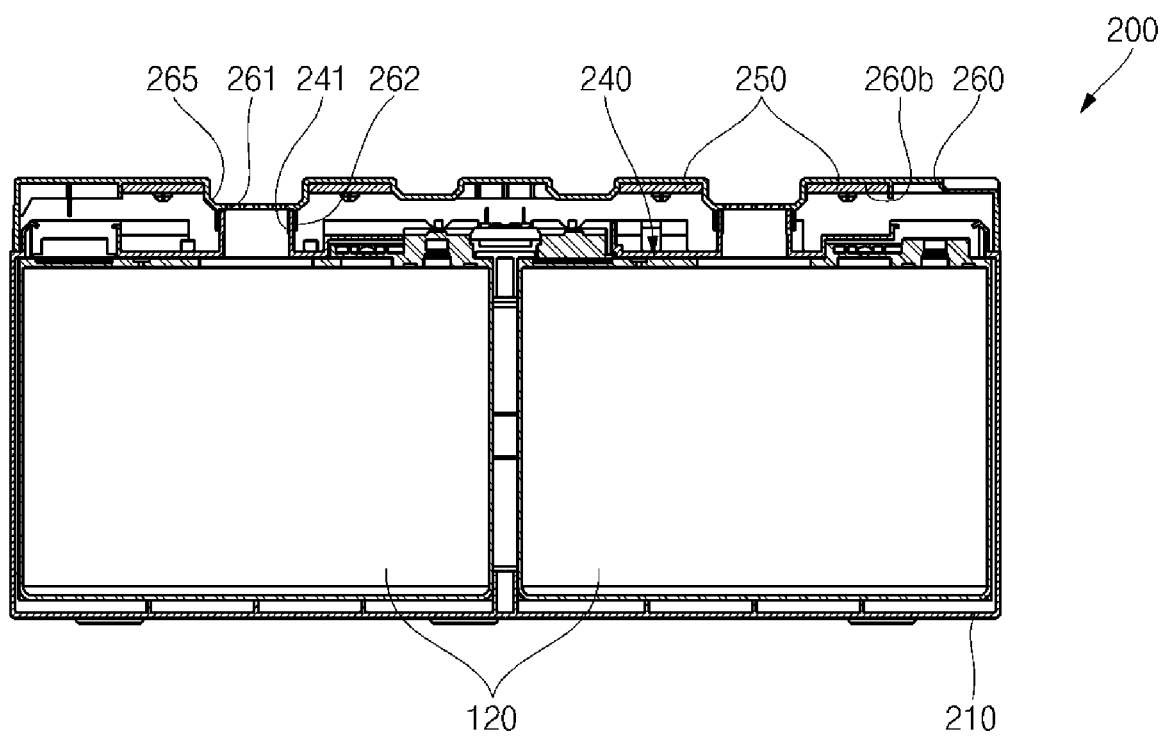
FIG. 19 is a cross-sectional view taken along the line E-E of FIG. 17.
Figure 20:
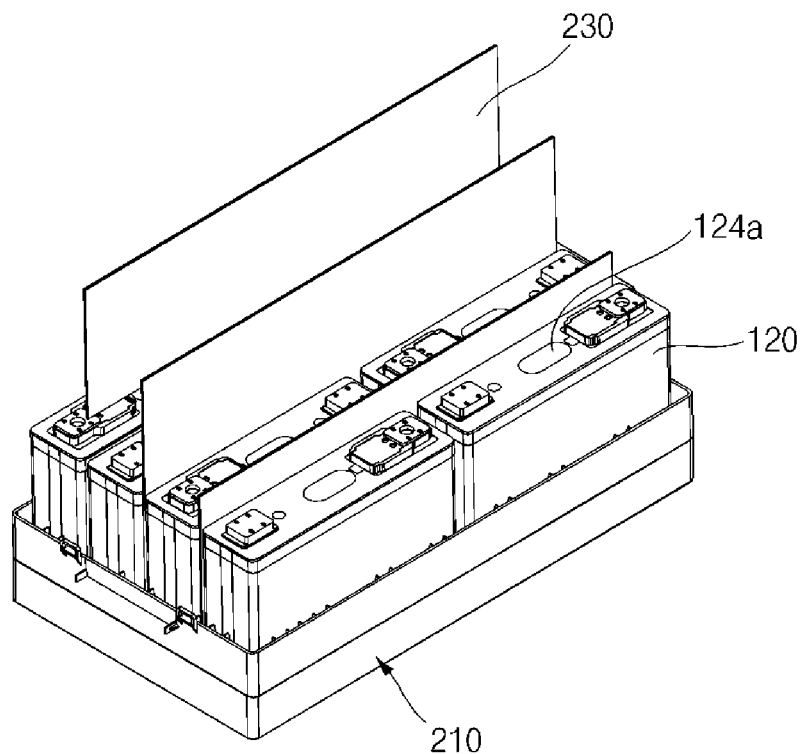
FIG. 20 is a perspective view illustrating battery cells and insulation spacers arranged on a cover member in the energy storage module of FIG. 17.

FIG. 17 is a perspective view of an energy storage module according to another embodiment of the present disclosure; FIG. 18 is a bottom perspective view of the energy storage module of FIG. 17; FIG. 19 is a cross-sectional view taken along the line E-E of FIG. 17; and FIG. 20 is a perspective view illustrating battery cells and insulation spacers arranged on a cover member in the energy storage module of FIG. 17.

Referring to FIGS. 17 to 20, an energy storage module 200 according to another embodiment of the present disclosure includes a cover member 210, battery cells 120, insulation spacers 230, a top plate 240, an extinguisher sheet 250, and a top cover 260.

In an embodiment, the cover member 210, the top plate 240, the extinguisher sheet 250, and the top cover 260 may be similarly configured to those of the energy storage module 100 described above. In addition, the battery cells 120 may be the same (or substantially the same) as those of the energy storage module 100. Accordingly, the following description will focus on differences between the energy storage module 200 and the energy storage module 100.

In an embodiment, the cover member 210 may include a bottom plate 211, an end plate (or a plurality of end plates) 212, and a side plate (or a plurality of side plates) 213 which together form a space in which the battery cells 120 and the insulation spacers 230 are alternately arranged on the bottom plate 211. In addition, the cover member 210 may fix positions of the battery cells 120 and the insulation spacers 230 and may protect the battery cells 120 from external impacts. In addition, the bottom plate 211 may further include openings (e.g., through-holes) 211a, through which the fire extinguishing agent from the extinguisher sheet 250 and the air moving along the exterior surfaces of the insulation spacers 230 are exhausted. The through-holes 211a may be positioned to correspond to the insulation spacers 230.

The insulation spacers 230 are positioned between adjacent ones of the battery cells 120 to prevent or substantially prevent the battery cells 120 from contacting one another, thereby maintaining the cases 121 of the battery cells 120 in electrically isolated states. In an embodiment, each of the insulation spacers 230 may have short side surfaces, each having a planar size sufficient to cover (e.g., entirely cover) the long side surfaces of two adjacent battery cells 120. For example, one of the insulation spacers 230 may be positioned between each group of four adjacent battery cells 120, which are arranged such that long side surfaces of two of the four battery cells 120 face each other. In addition, a distance is maintained between each of the insulation spacers 230 and the battery cells 120 to establish external air passages and/or fire extinguishing agent passages, thereby allowing for cooling of the battery cells 120. The insulation spacers 230 include (or are made of) a flame-retardant (or non-combustible) sheet that prevents (or substantially mitigates) a fire from spreading to neighboring battery cells and a heat-insulating sheet that prevents (or substantially mitigates) heat from propagating to neighboring battery cells when a fire occurs in any of the battery cells 120. The configurations of the insulation spacers 230 will be described in further detail below.

The top plate 240 is coupled to a top portion (e.g., a top surface or a top) of the cover member 210. The top plate 240 may be coupled to the cover member 210 while covering top portions of the battery cells 120.

The top plate 240 includes ducts 241 respectively corresponding to the vents 124a located on a top surface of each of the battery cells 120. The ducts 241 may be arranged in a direction, for example, in a length direction of the top plate 240. Accordingly, if the vent 124a of the battery cell 120 ruptures, the gas discharged through the vent 124a may move upwardly along the ducts 241 of the top plate 240. Configurations and operations of the ducts 241 will be described in further detail below.

The extinguisher sheet 250 is positioned between the top plate 240 and the top cover 260. The extinguisher sheet 250 may include a plurality of planar sheets located at opposite sides of the ducts 241 of the top plate 240 and extending in a length direction of the top plate 240. The extinguisher sheet 250 may be mounted on a bottom surface 260b of the top cover 260 in the form of a planar sheet extending in the length direction. Here, the length direction may refer to a direction in which the ducts 241 of the top plate 240 extend.

The top cover 260 is coupled to the top portion of the top plate 240. The top cover 260 may cover the top plate 240 and the extinguisher sheet 250, thereby protecting the top plate 240 and the extinguisher sheet 250 from external impacts applied to a top surface of the top cover 260. In addition, the top cover 260 includes discharge openings (e.g., discharge holes) 261. In addition, the top cover 260 also includes protrusion parts (e.g., protrusions) 262 spaced apart from (e.g. extending around) the outer periphery of respective ones of the discharge holes 261. The protrusion parts 262 may protrude downwardly. The ducts 241 may be respectively coupled to (e.g., may respectively extend into) the interior of the protrusion parts 262. In an embodiment, each of the discharge holes 261 may include a plurality discharge holes arranged in a direction, for example, in a length direction of the top cover 260. In addition, the discharge holes 261 are positioned to correspond to the ducts 241 of the top plate 240. In an embodiment, the discharge holes 261 may also be provided as a plurality of openings (e.g., holes) passing through top and bottom surfaces of the top cover 260 and spaced apart from one another. Accordingly, if the vent 124a of the battery cell 120 ruptures, the gas discharged from the vent 124a may be discharged to an exterior side along the duct 241 of the top plate 240 and the discharge holes 261 of the top cover 260.

In addition, the top cover 260 may further include openings (e.g., through-holes) 263, through which the fire extinguishing agent of the extinguisher sheet 250 is exhausted and the air moving along the exterior surfaces of the insulation spacers 230 is exhausted. The through-holes 263 may be positioned to respectively correspond to the insulation spacers 230.

In addition, recess parts (e.g., recessed portions or recesses) 265, each having a lower height (e.g., a lower height above the battery cells 120) than other areas of the top cover 260, may be provided in a length direction of the top cover 260, and the discharge holes 261 may be arranged at the recess parts 265. With this configuration, the gases discharged through the ducts 241 and the discharge openings 261 may gather in the recess parts 265, and the gas may be discharged to the exterior side by using, for example, a separate fan or a suction structure, thereby allowing the gas generated by the battery cells 120 to be discharged quickly.

Herein, configurations and operations of battery cells 120 and insulation spacers 230 in the energy storage module 200 according to an embodiment of the present disclosure will be described.

Figure 21A:
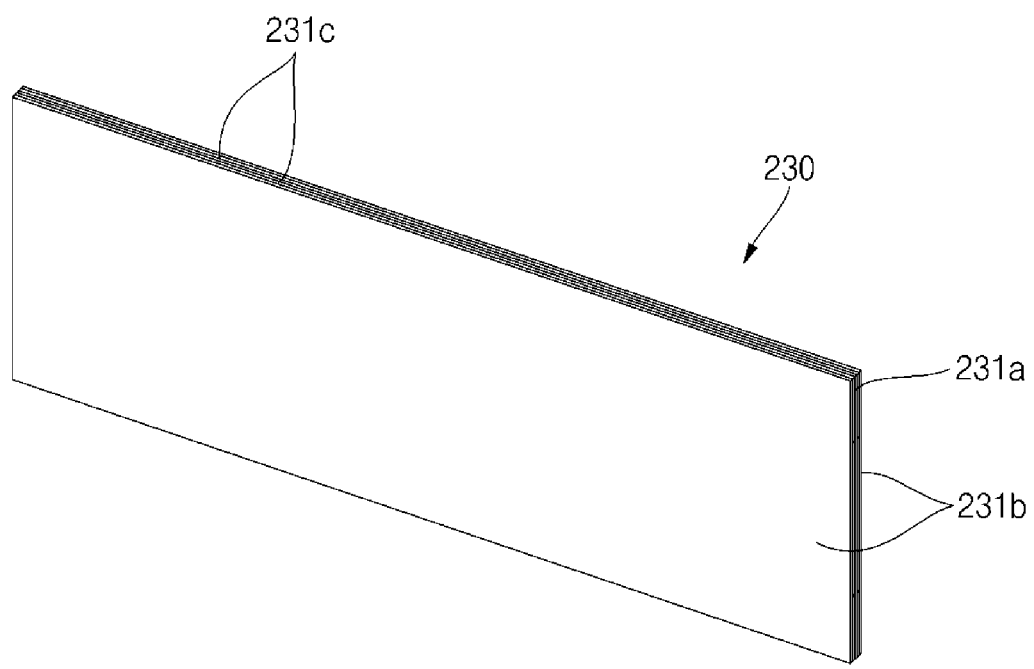
FIGS. 21A and 21B are a perspective view and an exploded perspective view, respectively, of an insulation spacer in the energy storage module of FIG. 17.
Figure 21B:
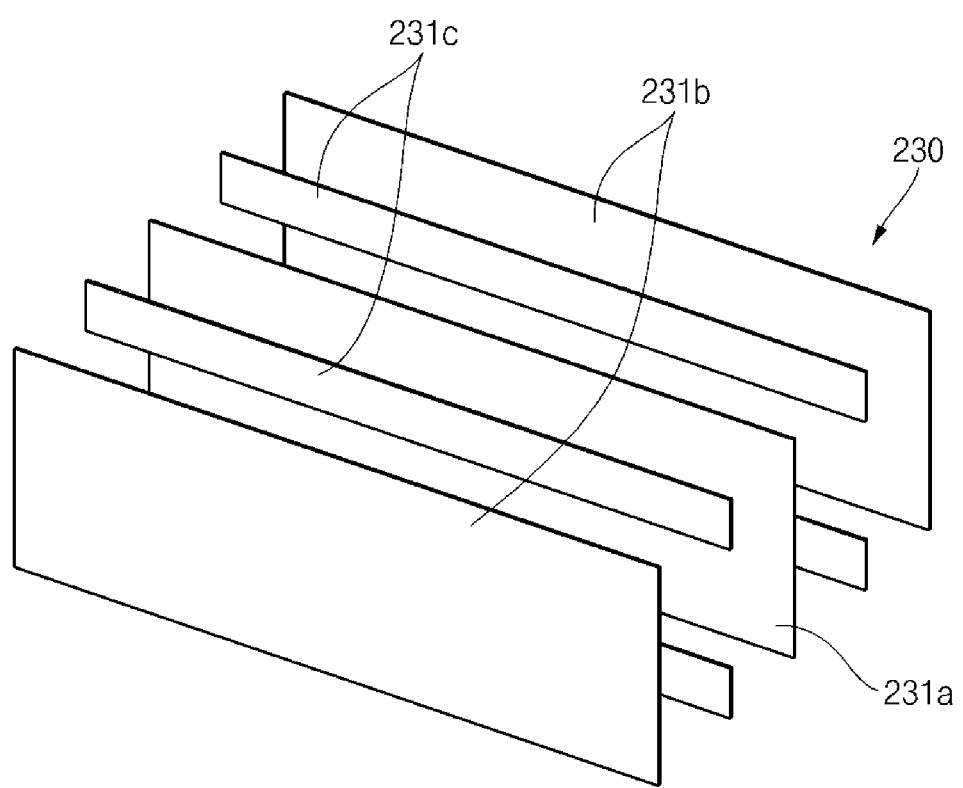
Figure 22:
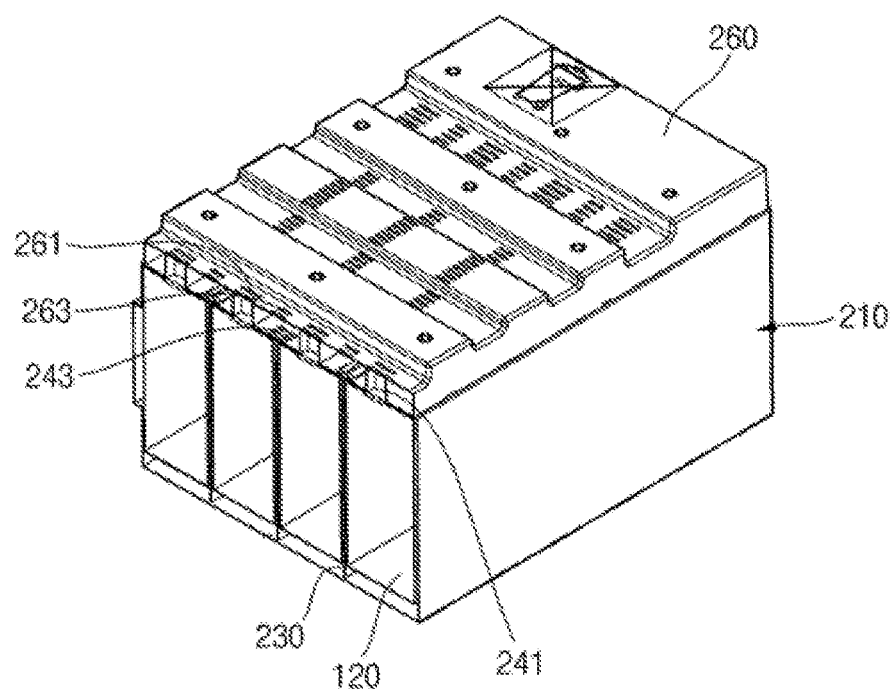
FIG. 22 is a cross-sectional view taken along the line F-F of FIG. 17.

FIGS. 21A and 21B are a perspective view and an exploded perspective view, respectively, of an insulation spacer in the energy storage module 200; and FIG. 22 is a cross-sectional view taken along the line F-F of FIG. 17.

The battery cells 120 and the insulation spacers 230 may be alternately arranged on a top surface of the bottom plate 211 of the cover member 210. Each of the insulation spacers 230 may have short side surfaces, each having a planar size sufficient to cover (e.g., entirely cover) long side surfaces of two adjacent battery cells 120. For example, one surface of one of the insulation spacers 230 may cover (e.g., entirely cover) the long side surfaces of two adjacent battery cells 120, and the other surface of the one insulation spacer 230 may cover (e.g., entirely cover) the long side surfaces of two other adjacent battery cells 120. For example, one of the insulation spacers 230 may be positioned between four battery cells 120 that are arranged such that long side surfaces of two battery cells 120 face long side surfaces of two other battery cells 120.

In addition, long side surfaces of the battery cells 120 may be spaced apart from long side surfaces of facing battery cells 120, and the insulation spacers 230 may be positioned between each of the long side surfaces of the battery cells 120.

In an embodiment, a distance (e.g., a first distance) between the long side surfaces of the facing battery cells 120 may be in a range from about 3.5 mm to about 4.5 mm. If the first distance is smaller than about 3.5 mm, air layers (e.g., air passages) may not be provided between each of the battery cells 120 and the insulation spacers 230, thereby lowering cooling efficiency. If the first distance is greater than about 4.5 mm, the energy storage module 200 may become unnecessarily bulky.

The insulation spacers 230, positioned between each facing pair of the battery cells 120, may prevent or substantially prevent the battery cells 120 from contacting each other, thereby maintaining the cases 121 of the battery cells 120 in electrically isolated states. In addition, the insulation spacer 230 and the long side surfaces of battery cells 120 are spaced apart from each other to establish external air passages. Here, the battery cells 120 may be cooled by external air moving along (or through) the external air passages.

In an embodiment, the insulation spacers 230 may consist of sheets 231 (e.g., only sheets 231) without separate edge parts. The insulation spacers 230 may include a flame-retardant (or non-combustible) sheet that prevents (or substantially mitigates) the fire from spreading to neighboring battery cells 120, and a heat-insulating sheet that prevents (or substantially mitigates) heat from propagating to neighboring battery cells 120. For example, the sheet parts 231 of the insulation spacers 230 may include a heat-insulating first sheet 231a and two flame-retardant (or non-combustible) second sheets 231b respectively adhered to opposite surfaces of the first sheet 231a by using one or more adhesion members 231c. In an embodiment, the first sheet 231a and the second sheets 231b have the same (or substantially the same) size. In an embodiment, a thickness of the insulation spacer 230 may not exceed about 50% of the first distance to facilitate movement of the fire extinguishing agent, which will be described in further detail below.

An adhesion member 231c may be positioned between the first sheet 231a and the second sheets 231b at a distance (e.g., a reference distance) from top and bottom ends of the first sheet 231a to attach the first sheet 231a and the second sheets 231b to each other. In an embodiment, the adhesion member 231c may have the same (or substantially the same) width as the first sheet 231a and the second sheets 231b in their width directions. For example, the top and bottom ends of the first sheet 231a may be respectively adhered to top and bottom ends of the second sheet 231b by the adhesion member 231c.

In an embodiment, when the sheet part 231 has a width-direction size greater than twice a height-direction size thereof, the adhesion member 231c may be applied to the top and bottom ends thereof to improve adhesion performance. For example, when the sheet part 231 has the width-direction size greater than twice the height-direction size thereof, such as in the embodiment shown in FIG. 21A, the adhesion performance may be lowered when the adhesion member 231c is applied to opposite ends of the sheet part 131, due to a reduction in the adhesion area. In this case, the insulation spacer 230 may have the same (or substantially the same) configuration as the sheet part 131 described above, as shown in FIG. 21B.

As discussed above, if a fire extinguishing agent is applied from top portions of the insulation spacers 230, the fire extinguishing agent may move downwardly along the surfaces of the sheet part 231. Therefore, the fire extinguishing agent may contact the case 121 of the adjacent battery cells 120, thereby extinguishing any fire and cooling the battery cells 120. Herein, the movement of the fire extinguishing agent and the cooling of the battery cells 120 using the air will be described in further detail.

As shown in FIG. 22, the top plate 240 further includes openings (e.g., opening holes) 243 located to respectively correspond to the insulation spacers 230. Accordingly, the fire extinguishing agent emitted from the extinguisher sheet 250 may pass through the top plate 240 through the opening holes 243 of the top plate 240 to reach the insulation spacers 230. In addition, the fire extinguishing agent may move along surfaces of the insulation spacers 230 that face the cases 121 of the battery cells 120, thereby extinguishing and cooling the battery cells 120. The fire extinguishing agent is emitted (or sprayed) from the extinguisher sheet 250 above one or more of the battery cells 120, the temperature of which is higher than a reference temperature. Therefore, the fire extinguishing agent may be sprayed from a top portion of the battery cell 120, the temperature of which has increased. In addition, because the fire extinguishing agent moves along the surfaces of the insulation spacers 230 positioned at front and rear sides of the corresponding battery cell 120, the corresponding battery cell 120 can be both extinguished and cooled.

In addition, the top cover 260 may further include openings (e.g., through-holes) 263 that pass through top and bottom surfaces of the top cover 260 and are located to respectively correspond to the opening holes 243. For example, the through-holes 263 may respectively correspond to the insulation spacers 230.

In addition, the bottom plate 211 of the cover member 210 may also include openings (e.g., through-holes) 211*a* located to respectively correspond to the insulation spacers 230. Thus, air introduced through the through-holes 263 of the top cover 260 and the openings 243 of the top plate 240 may move along spaces provided between the insulation spacers 230 and the battery cells 120 to be discharged through the through-holes 211*a* of the bottom plate 211. Of course, the movement of the air (e.g., the airflow direction) may be reversed. In such a way, air passages may be provided by the through-holes 211*a* and 263, and the opening holes 243, thereby improving cooling efficiency.

Herein, configurations of the battery cell 120 used in the energy storage modules 100 and 200 according to an embodiment of the present disclosure will be described in further detail.

Figure 23A:
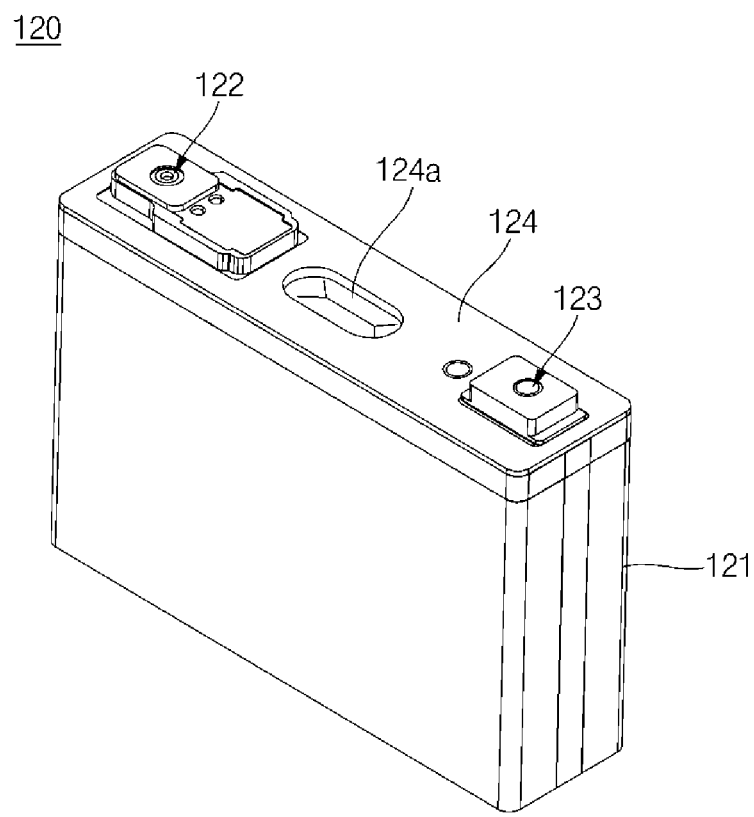
FIGS. 23A and 23B are a perspective view and a cross-sectional view of a battery cell used in the energy storage module according to an embodiment of the present disclosure.
Figure 23B:
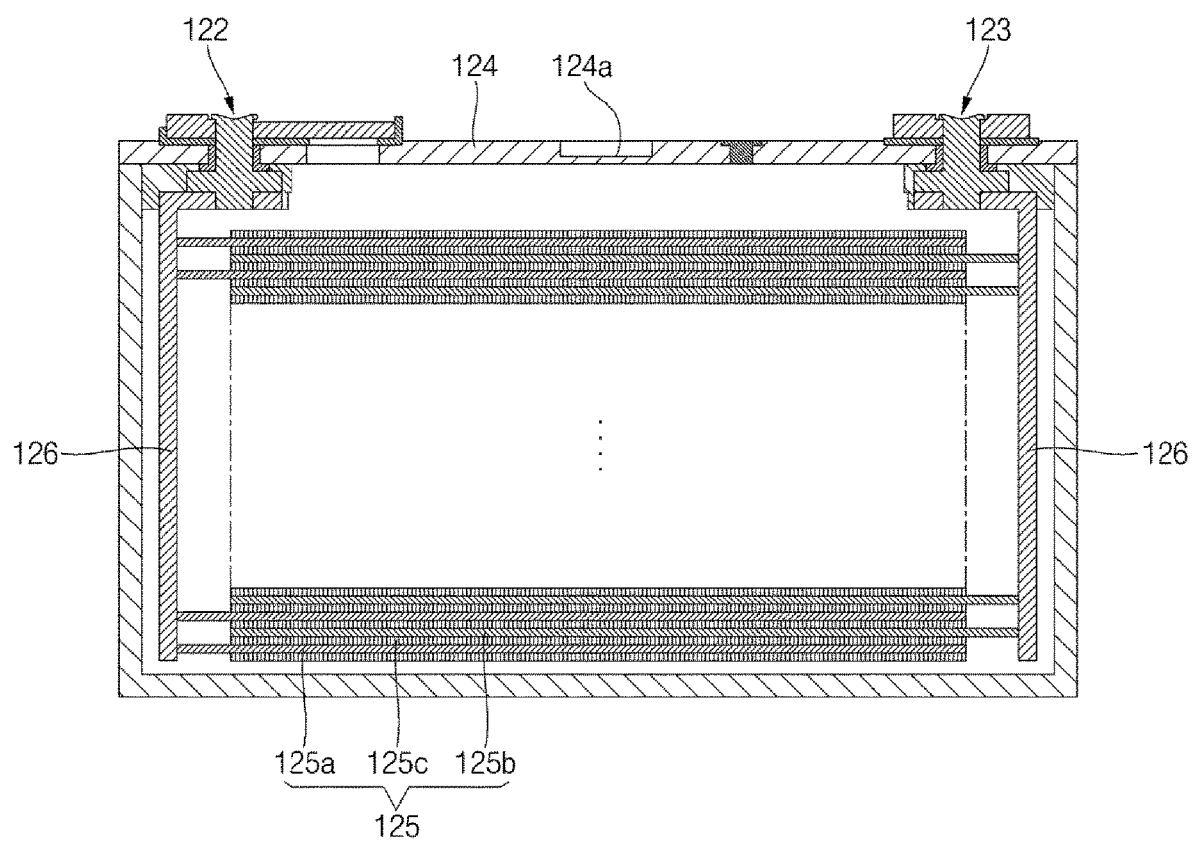

FIGS. 23A and 23B are a perspective view and a cross-sectional view, respectively, of a battery cell used in the energy storage module according to an embodiment of the present disclosure.

Referring to FIGS. 23A and 23B, the battery cell 120 is configured such that an electrode assembly 125 is accommodated in a case 121, and a cap plate 124 covers a top portion of the case 121. In an embodiment, a vent 124*a* having a smaller thickness than other regions is located approximately at the center of the cap plate 124. A duct 141 of the top plate 140 is located to correspond to a top portion of a vent 124*a*, as described above.

In addition, the electrode assembly 125 may be electrically connected to a first electrode terminal 122 and a second electrode terminal 123 located on the cap plate 124 through a pair of current collectors 126. For the sake of convenience, in the following description, the first electrode terminal 122 will be referred to as a negative electrode terminal and the second electrode terminal 123 will be referred to as a positive electrode terminal, but polarities thereof may be reversed.

The electrode assembly 125 may include a negative electrode 125*a*, a positive electrode 125*b* positioned to face the negative electrode 125*a*, and a separator 125*c* positioned between the negative electrode 125*a* and the positive electrode 125*b*, and the electrode assembly 125 may be accommodated in the case 121 together with an electrolyte (not shown).

While the energy storage module of the present disclosure has been particularly shown and described with reference to some example embodiments thereof, it will be understood by those of ordinary skill in the art that various changes in form and details may be made therein without departing from the scope of the present disclosure as set forth in the following claims and their equivalents.

What is claimed is:

1. An energy storage module comprising:
    a plurality of battery cells arranged in a length direction such that long side surfaces of adjacent battery cells of the battery cells face one another;
    a plurality of insulation spacers, at least one of the insulation spacers being between the long side surfaces of each adjacent pair of the battery cells;
    a cover member comprising an internal receiving space configured to accommodate the battery cells and the insulation spacers;
    a top plate coupled to a top of the cover member, the top plate comprising ducts respectively corresponding to vents of the battery cells and having opening holes respectively corresponding to the insulation spacers;
    a top cover coupled to a top of the top plate and having discharge holes respectively corresponding to the ducts; and
    an extinguisher sheet between the top cover and the top plate, the extinguisher sheet being configured to emit a fire extinguishing agent at a temperature exceeding a reference temperature,
    wherein the top cover comprises protrusion parts on a bottom surface thereof, the protrusion parts covering an exhaust region and being coupled to an exterior of each of the ducts.

2. The energy storage module of claim 1, wherein each of the insulation spacers comprises a heat-insulating first sheet and flame-retardant or non-combustible second sheets respectively adhered to opposite surfaces of the first sheet by an adhesion member.

3. The energy storage module of claim 2, wherein the first sheet comprises ceramic paper, and the second sheets comprise mica paper.

4. The energy storage module of claim 2, wherein the first sheet comprises a ceramic fiber comprising an alkaline earth metal.

5. The energy storage module of claim 2, wherein each of the insulation spacers has a width-direction size less than twice a height-direction size thereof and comprises a sheet part comprising the first sheet and the second sheets adhered to each other at opposite ends thereof by the adhesion member.

6. The energy storage module of claim 5, wherein each of the insulation spacers further comprises an edge part made of a plastic material, the edge part being formed by insert molding to cover peripheral edges of the sheet part.

7. The energy storage module of claim 5, wherein the first sheet and the second sheets are spaced apart from each other at central portions thereof to define air passages to allow for air movement.

8. The energy storage module of claim 2, wherein a width-direction size of each of the insulation spacers is greater than twice a height-direction size thereof, and
    wherein the first sheet and the second sheets respectively comprise regions adhered to each other by the adhesion member.

9. The energy storage module of claim 1, wherein the long side surfaces of the adjacent battery cells are spaced apart from each other by a first distance, and
    wherein a thickness of each of the insulation spacers is less than 50% of the first distance.

10. The energy storage module of claim 1, wherein when the fire extinguishing agent is emitted from the extinguisher sheet, the fire extinguishing agent is applied to spaces between the insulation spacers and the battery cells through the opening holes to be brought into contact with the long side surfaces of the battery cells.

11. The energy storage module of claim 1, wherein the top cover further comprises an inclined part to have a gradually increasing thickness from the exhaust region to the protrusion part.

12. The energy storage module of claim 11, wherein a top end of each of the ducts is located below the inclined part.

13. The energy storage module of claim 11, wherein a space is defined between each of the ducts and a corresponding one of the protrusion parts, and some of the gas discharged through each of the vents moves to the respective space via the duct and the inclined part.

14. The energy storage module of claim 1, wherein each of the ducts tapers away from a bottom portion thereof with an inner diameter thereof gradually decreasing upwards.

15. The energy storage module of claim 1, wherein an overall area occupied by the discharge holes is not less than about 30% of an area of the exhaust region.

16. The energy storage module of claim 1, wherein a phase change begins to occur in the fire extinguishing agent at a temperature in a range from about 40° C. to about 60° C.

* * * * *